United States Patent
Yoshida

(10) Patent No.: US 10,144,214 B2
(45) Date of Patent: Dec. 4, 2018

(54) CONTROL DEVICE FOR CONTROLLING PRINTER TO EXECUTE MULTI-PASS PRINTING

(71) Applicant: BROTHER KOGYO KABUSHIKI KAISHA, Nagoya-shi, Aichi-ken (JP)

(72) Inventor: Yasunari Yoshida, Aichi-ken (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/713,193

(22) Filed: Sep. 22, 2017

(65) Prior Publication Data

US 2018/0093472 A1    Apr. 5, 2018

(30) Foreign Application Priority Data

Sep. 30, 2016    (JP) ................. 2016-193428

(51) Int. Cl.
| | |
|---|---|
| B41J 2/045 | (2006.01) |
| B41J 25/00 | (2006.01) |
| G06K 9/38 | (2006.01) |
| G06K 9/46 | (2006.01) |
| G06K 15/10 | (2006.01) |
| B41J 2/21 | (2006.01) |

(52) U.S. Cl.
CPC ....... *B41J 2/04508* (2013.01); *B41J 2/04586* (2013.01); *B41J 2/2132* (2013.01); *B41J 2/2139* (2013.01); *B41J 2/2142* (2013.01); *B41J 2/2146* (2013.01); *B41J 25/006* (2013.01); *G06K 9/38* (2013.01); *G06K 9/46* (2013.01); *G06K 15/102* (2013.01)

(58) Field of Classification Search
CPC .. B41J 2/04508; B41J 2/04586; B41J 2/2139; B41J 2/2142; B41J 2/2146; B41J 25/006; G06K 9/38; G06K 9/46; G06K 15/102
See application file for complete search history.

(56) References Cited

U.S. PATENT DOCUMENTS

| | | | |
|---|---|---|---|
| 2003/0043219 A1 | 3/2003 | Kojima | |
| 2014/0153056 A1* | 6/2014 | Takagi | G06F 15/025 358/3.09 |
| 2016/0167376 A1* | 6/2016 | Katsuyama | B41J 2/04586 347/15 |
| 2017/0050431 A1* | 2/2017 | Morikawa | B41J 2/04536 |

FOREIGN PATENT DOCUMENTS

| | | |
|---|---|---|
| JP | 2003-062984 A | 3/2003 |
| JP | 2009-269373 A | 11/2009 |

* cited by examiner

*Primary Examiner* — Anh T. N. Vo
(74) *Attorney, Agent, or Firm* — Merchant & Gould P.C.

(57) ABSTRACT

In a control device, a controller is configured to perform: acquiring target image data; and controlling a printer to execute a first forming process forming dots on a first scanning range and a second forming process forming dots on a second scanning range. The first scanning range overlaps the second scanning range at an overlapping area. The overlapping area includes a first position corresponding to a first pixel and a second position corresponding to a second pixel. In a case where both a first pixel value and a second pixel value indicate forming a dot and the target image data satisfies a condition requiring that density in a region including the first pixel is equal to or more than a reference, the first forming process forms a dot at the first position and the second forming process forms a dot at both the first position and the second position.

13 Claims, 12 Drawing Sheets

FIG. 9A

|  |  |  |  |  |  |
|---|---|---|---|---|---|
| M | M | L | – | M | M |
| S | M | – | S | – | M |
| M | – | L | L | S | M |
| – | M | – | S | M | – |
| S | L | L | – | S | L |

FIG. 9B

|  |  |  |  |  |  |
|---|---|---|---|---|---|
| 0 | 0 | 0 | 0 | 0 | 0 |
| 0 | 0 | 0 | 0 | 0 | 0 |
| 0 | 0 | 1 | 1 | 0 | 0 |
| 0 | 0 | 0 | 0 | 0 | 0 |
| 0 | 0 | 0 | 0 | 0 | 0 |

FIG. 9C

|  |  |  |  |  |  |
|---|---|---|---|---|---|
| – | M | – | – | – | M |
| – | – | – | – | – | – |
| – | – | – | L | – | – |
| – | – | – | – | – | – |
| – | L | – | – | – | L |

FIG. 9D

|  |  |  |  |  |  |
|---|---|---|---|---|---|
| M | – | L | – | M | – |
| – | M | – | S | – | M |
| M | – | L | L | S | – |
| – | M | – | S | – | – |
| S | – | L | – | S | – |

FIG. 9E

|  |  |  |  |  |  |
|---|---|---|---|---|---|
| – | – | – | – | – | – |
| S | – | – | – | – | – |
| – | – | – | – | – | M |
| – | – | – | – | M | – |
| – | – | – | – | – | – |

FIG. 9F

|  |  |  |  |  |  |
|---|---|---|---|---|---|
| M | M | L | – | M | M |
| S | M | – | S | – | M |
| M | – | L | L | S | M |
| – | M | – | S | M | – |
| S | L | L | – | S | L | ns
CONTROL DEVICE FOR CONTROLLING PRINTER TO EXECUTE MULTI-PASS PRINTING

CROSS REFERENCE TO RELATED APPLICATION

This application claims priority from Japanese Patent Application No. 2016-193428 filed Sep. 30, 2016. The entire content of the priority application is incorporated herein by reference.

TECHNICAL FIELD

The present disclosure relates to a method of controlling a printer to execute a printing operation, the printer including a conveying mechanism that conveys a printing medium, and a print head having a plurality of nozzles.

BACKGROUND

An inkjet printer known in the art forms dots on paper by repeatedly moving a print head in a main scanning direction (an operation called a "main scan") and ejects ink from a plurality of nozzles formed in the print head during each main scan. However, this type of printer is susceptible to a problem called "banding" in the printed image that is caused by irregularities in the amounts that the sheets are conveyed, for example.

For use by this type of printer, a technique that employs a plurality of main scans to complete a single raster in the printed image is known. This technique enables the printer to avoid producing the aforementioned banding in printed images.

SUMMARY

However, the conventional technique described above may inadvertently produce gaps between dots caused by deviation in the relative positions of dots formed during one main scan and dots formed during another main scan, potentially decreasing the density of the printed image.

In view of the foregoing, it is an object of the present disclosure to provide a printing technique that avoids a decrease in the density of the printed image caused by deviations in the relative positions of dots.

In order to attain the above and other objects, the present disclosure provides a control device for controlling a printer. The printer includes a print head. The print head is configured to reciprocally move in a main scanning direction. The print head has a plurality of nozzles arranged in a sub scanning direction perpendicular to the main scanning direction. Each of the plurality of nozzles is configured to eject an ink droplet to form a dot on a printing medium. The printer is configured to repeatedly execute a forming process and a conveying process. The forming process forms dots on the printing medium while moving the print head in the main scanning direction. The conveying process intermittently conveys the printing medium in the sub scanning direction with respect to the print head. The control device includes a controller. The controller is configured to perform: acquiring target image data representing a target image, the target image including a plurality of pixels, the target image data including a plurality of pixel values for respective ones of the plurality of pixels, each of the plurality of pixel values specifying a dot formation state for a corresponding pixel; and controlling the printer to execute a first forming process and a second forming process, the first forming process forming dots on a first scanning range of the printing medium while moving the print head in the main scanning direction to scan the first scanning range, the second forming process being executed after execution of the first forming process and forming dots on a second scanning range of the printing medium while moving the print head in the main scanning direction to scan the second scanning range, at least part of the first scanning range overlapping at least part of the second scanning range at an overlapping area. The overlapping area includes a first position and a second position. The first position corresponds to a first pixel in the target image. The second position corresponds to a second pixel in the target image. The first pixel has a first pixel value in the target image data. The second pixel has a second pixel value in the target image data. In a case where both the first pixel value and the second pixel value indicate forming a dot and the target image data satisfies a first condition requiring that density in a first region including the first pixel is equal to or more than a first reference, the first forming process forms a dot at the first position and the second forming process forms a dot at both the first position and the second position. In a case where both the first pixel value and the second pixel value indicate forming a dot and the target image data does not satisfy the first condition, the first forming process forms a dot at the first position and the second forming process does not form a dot at the first position but forms a dot at the second position.

According to another aspect, the present disclosure provides a non-transitory computer readable storage medium storing a set of program instructions for a control device for controlling a printer. The printer includes a print head. The print head is configured to reciprocally move in a main scanning direction. The print head has a plurality of nozzles arranged in a sub scanning direction perpendicular to the main scanning direction. Each of the plurality of nozzles is configured to eject an ink droplet to form a dot on a printing medium. The printer is configured to repeatedly execute a forming process and a conveying process. The forming process forms dots on the printing medium while moving the print head in the main scanning direction. The conveying process intermittently conveys the printing medium in the sub scanning direction with respect to the print head. The control device includes a controller. The set of program instructions, when executed by the controller, causing the control device to perform: acquiring target image data representing a target image, the target image including a plurality of pixels, the target image data including a plurality of pixel values for respective ones of the plurality of pixels, each of the plurality of pixel values specifying a dot formation state for a corresponding pixel; and controlling the printer to execute a first forming process and a second forming process, the first forming process forming dots on a first scanning range of the printing medium while moving the print head in the main scanning direction to scan the first scanning range, the second forming process being executed after execution of the first forming process and forming dots on a second scanning range of the printing medium while moving the print head in the main scanning direction to scan the second scanning range, at least part of the first scanning range overlapping at least part of the second scanning range at an overlapping area. The overlapping area includes a first position and a second position. The first position corresponds to a first pixel in the target image. The second position corresponds to a second pixel in the target image. The first pixel has a first pixel value in the target image data. The second pixel has a second pixel value in the target image data. In a case where both the first pixel value and the second pixel value indicate forming a dot and the target image data satisfies a first condition requiring that density in a first region including the first pixel is equal to or more than a first reference, the first forming process forms a dot at the first position and the second forming process forms a dot at both the first position and the second position. In a case where both the first pixel value and the second pixel value indicate forming a dot and the target image data does not satisfy the first condition, the first forming process forms a dot at the first position and the second forming process does not form a dot at the first position but at the second position.

BRIEF DESCRIPTION OF THE DRAWINGS

The particular features and advantages of the disclosure as well as other objects will become apparent from the following description taken in connection with the accompanying drawings, in which:

FIGS. 7A through 7C are explanatory diagrams showing data used in the print data generating process, and in which FIG. 7A is an enlarged view showing a portion of the dot pattern data illustrated in FIG. 4; FIG. 7B conceptually illustrates a partial dot image represented by partial dot data; and FIG. 7C illustrates a portion of pass data corresponding to the partial dot data representing the partial dot image illustrated in FIG. 7B;

FIG. 8B indicates a sub pass process used to form a dot for each of pixels in the dot image illustrated in FIG. 8A; FIG. 8C indicates target pixels for forced output in a second sub pass process; FIG. 8D shows first sub pass data corresponding to the dot image illustrated in FIG. 8A; FIG. 8E shows second sub pass data corresponding to the dot image illustrated in FIG. 8A; FIG. 8F shows third sub pass data corresponding to the dot image illustrated in FIG. 8A; and FIG. 8G conceptually illustrates a printed image printed according to the first through third sub pass data illustrated in FIGS. 8D through 8F;

FIGS. 9A through 9F are explanatory diagrams for printing of a medium-density image, and in which FIG. 9A conceptually illustrates a medium-density dot image represented by dot data; FIG. 9B indicates target pixels for forced output in a second sub pass process; FIG. 9C shows first sub pass data corresponding to the dot image illustrated in FIG. 9A; FIG. 9D shows second sub pass data corresponding to the dot image illustrated in FIG. 9A; FIG. 9E shows third sub pass data corresponding to the dot image illustrated in FIG. 9A; and FIG. 9F conceptually illustrates a printed image printed according to the first through third sub pass data illustrated in FIGS. 9C through 9E;

FIGS. 10A through 10C are explanatory diagrams representing a printed image formed on sheet with a plurality of dots, in which FIG. 10A shows a printed image serving as a comparative example with no positional deviation; FIG. 10B shows a printed image serving as a comparative example with positional deviation; and FIG. 10C shows a printed image of the first embodiment with positional deviation;

DETAILED DESCRIPTION

A. First Embodiment

A-1. Structure of a Printing Apparatus

Figure 1:
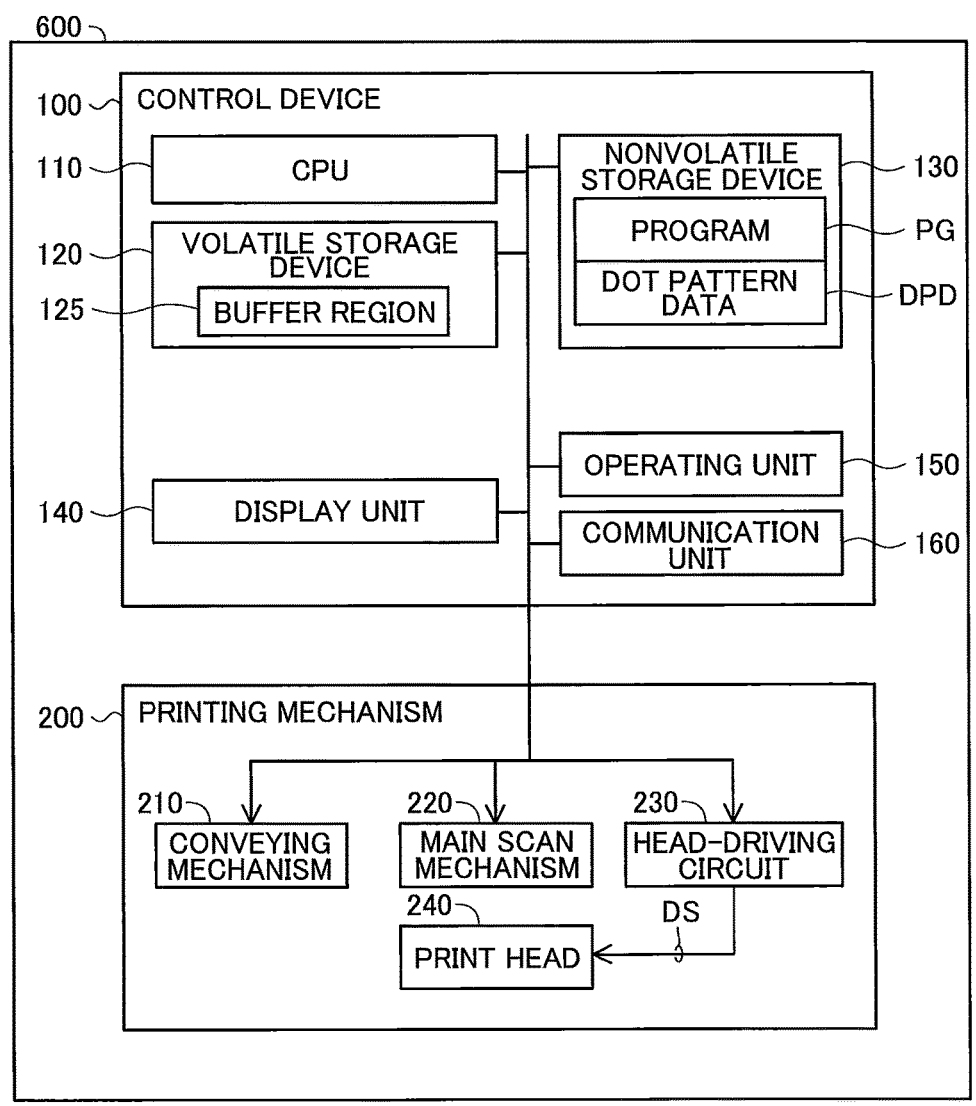
FIG. 1 is a block diagram showing structure of a printing apparatus according to embodiments of the present disclosure.

Next, embodiments of the present disclosure will be described while referring to the accompanying drawings. FIG. 1 is a block diagram showing the structure of a printing apparatus 600 according to the embodiments. The printing apparatus 600 is an inkjet printer that prints images on sheets of paper or another recording medium by forming dots on the paper with ink. The printing apparatus 600 includes a control device 100 for controlling all operations of the printing apparatus 600, and a printing mechanism 200 serving as the printer.

The control device 100 includes a central processing unit (CPU) 110 functioning as the controller; a volatile storage device 120, such as dynamic random-access memory (DRAM); a nonvolatile storage device 130, such as flash memory or a hard disk drive; a display unit 140, such as a liquid crystal display; an operating unit 150, such as a touchscreen superimposed on a liquid crystal display panel, and various buttons; and a communication unit 160 having a communication interface for communicating with external devices, such as a personal computer (not shown).

The volatile storage device 120 is provided with a buffer region 125 for temporarily storing various intermediate data generated when the CPU 110 performs processes. The nonvolatile storage device 130 stores a computer program PG for controlling the printing apparatus 600, and dot pattern data DPD used in a print data generating process described later.

The computer program PG is pre-stored in the nonvolatile storage device 130 prior to shipping the printing apparatus 600. Note that the computer program PG may be supplied to the user on a DVD-ROM or other storage medium, or may be made available for download from a server. By executing the computer program PG, the CPU 110 implements a control process of the printing apparatus 600 described later. The dot pattern data DPD may be incorporated in the computer program PG or supplied together with the computer program PG.

The printing mechanism 200 can perform printing operations by ejecting ink in the colors cyan (C), magenta (M), yellow (Y), and black (K) under control of the CPU 110 in the control device 100. In the present embodiment, ink in the chromatic colors C, M, and Y is dye-based ink, while the achromatic K ink is pigment-based ink. The printing mechanism 200 includes a conveying mechanism 210, a main scan mechanism 220, a head-driving circuit 230, and a print head 240. The conveying mechanism 210 is provided with a conveying motor (not shown) that produces a drive force for conveying sheets of paper, serving as the printing medium in the present embodiment, along a prescribed conveying path. The main scan mechanism 220 is provided with a main scan motor (not shown) that produces a drive force for reciprocating the print head 240 in the main scanning direction (hereinafter also called a "main scan"). The head-driving circuit 230 provides a drive signal DS to the print head 240 for driving the print head 240 while the main scan mechanism 220 is moving the print head 240 in a main scan. The print head 240 forms dots on a sheet of paper conveyed by the conveying mechanism 210 by ejecting ink according to the drive signal DS. In this description, the process of forming dots on paper while performing a main scan will be called a "pass process" or a "forming process." The CPU 110 of the control device 100 controls the printing mechanism 200 to print an image by repeatedly controlling the printing mechanism 200 to alternately execute a conveying process with the conveying mechanism 210 for conveying the sheet in a conveying direction orthogonal to the main scanning direction (hereinafter called the "sub scanning direction"), and a pass process.

Figure 2:
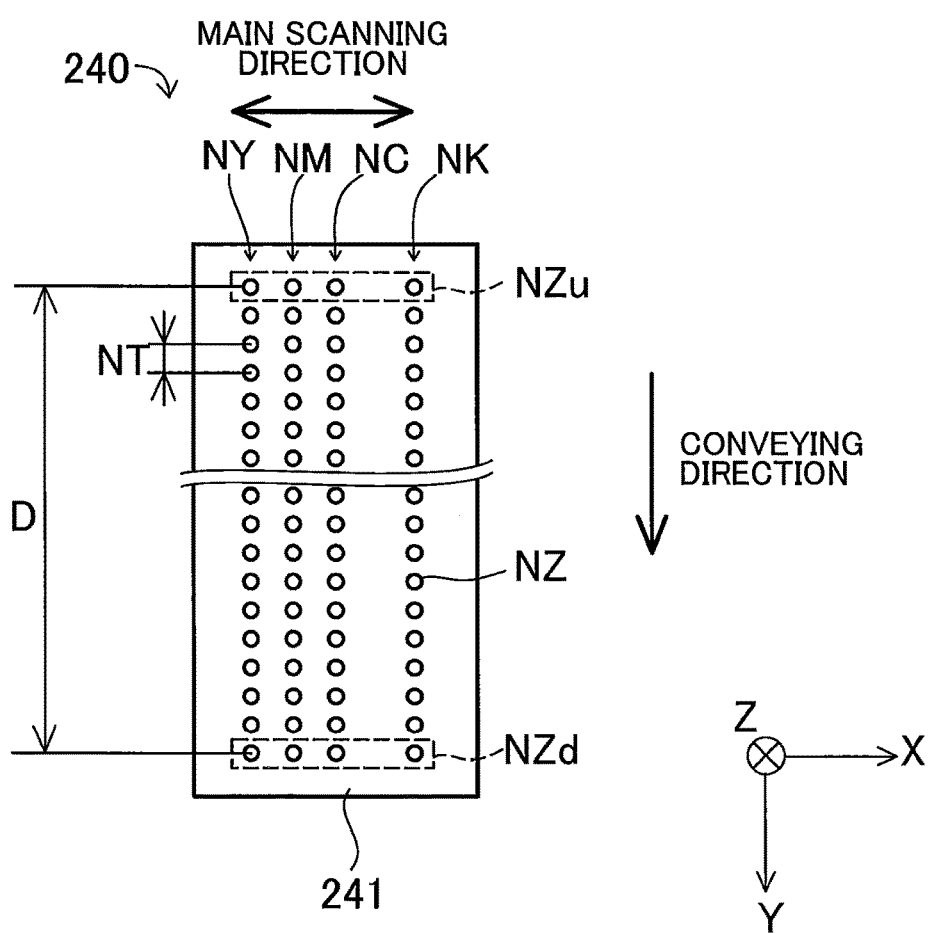
FIG. 2 shows general structure of a print head in a printing mechanism of the printing apparatus.

FIG. 2 shows the general structure of the print head 240. As shown in FIG. 2, the print head 240 has a nozzle-forming surface 241 constituting the −Z side surface thereof. Nozzle rows NC, NM, NY, and NK for forming dots by ejecting ink droplets in the respective colors C, M, Y, and K are formed in the nozzle-forming surface 241 of the print head 240. Each nozzle row includes a plurality of nozzles NZ (one hundred nozzles, for example) spaced at a prescribed nozzle pitch NT in the conveying direction. The nozzle rows are arranged at different positions from each other relative to the main scanning direction. In FIG. 2 and subsequent drawings, the +Y direction denotes the conveying direction (sub scanning direction), and the X direction (+X and −X directions) denotes the main scanning direction. The nozzle NZ in each nozzle row that is positioned on the downstream end in the conveying direction (i.e., the +Y end in FIG. 2) will be called a downstream nozzle NZd, while the nozzle NZ positioned on the upstream end in the conveying direction (i.e., the −Y end in FIG. 2) will be called an upstream nozzle NZu. In the following description, the length in the conveying direction of the nozzle rows from one specific nozzle NZ (nozzle NZ1, for example) to another specific nozzle NZ (nozzle NZ2, for example) will be called the nozzle length from nozzle NZ1 to nozzle NZ2. The nozzle length from the upstream nozzle NZu to the downstream nozzle NZd will be called the total nozzle length D (see FIG. 2). Hereinafter, the +Y side will simply be called the "downstream side," while the −Y side will simply be called the "upstream side."

The print head 240 can form dots in a plurality of sizes with each color of ink. Specifically, the print head 240 can form a small dot, a medium dot that is larger than the small dot, and a large dot that is larger than the medium dot. The small dot is the smallest dot that the printing mechanism 200 can form, and the large dot is the largest dot that the printing mechanism 200 can form.

A-2. Overview of a Control Process

Figure 3:
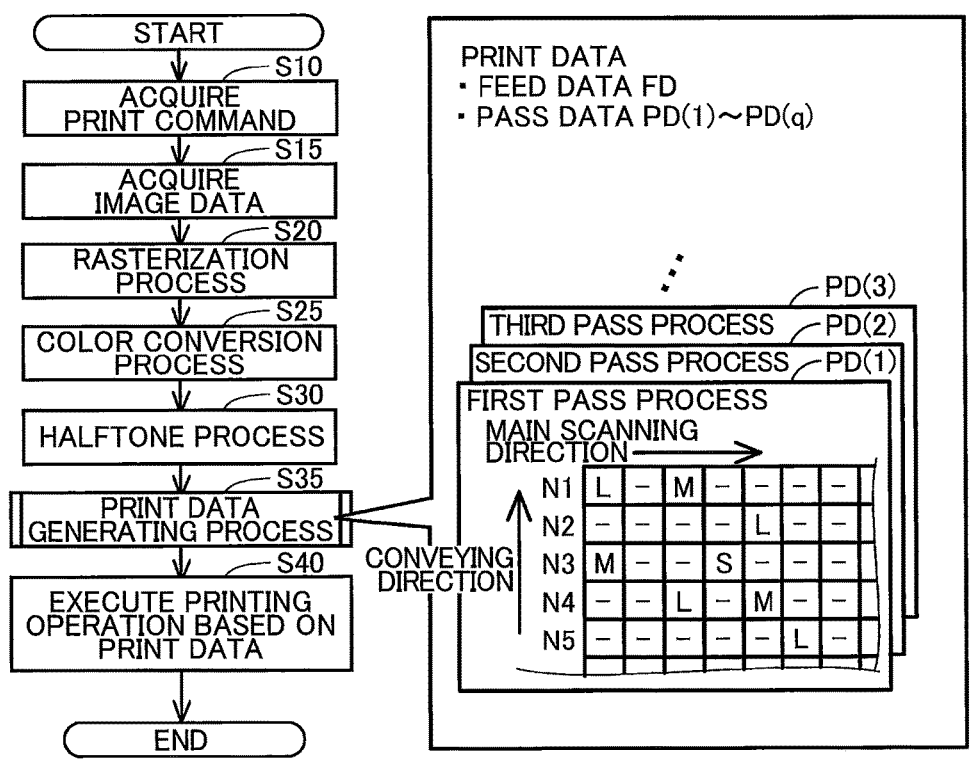
FIG. 3 is a flowchart illustrating steps in a control process executed by a CPU of a control device.

The CPU 110 of the control device 100 executes a control process for controlling the printing mechanism 200 to execute a printing operation based on a print command from the user. FIG. 3 is a flowchart illustrating steps in this control process.

In S10 of FIG. 3, the CPU 110 acquires a prescribed print command from the user via the operating unit 150. The print command includes at least an instruction specifying image data representing an image to be printed.

In S15 the CPU 110 acquires the image data specified in the print command. For example, the CPU 110 may acquire image data specified by the user from a storage device, such as USB memory (not shown) or the nonvolatile storage device 130. Alternatively, the CPU 110 may acquire image data that is transmitted together with the print command from a user terminal (not shown). The image data acquired in S15 may be vector data generated by an application program or bitmap data generated by a digital camera, for example.

In S20 the CPU 110 executes a rasterization process on the image data to generate bitmap data that includes a plurality of pixels of a number corresponding to the printing resolution. More specifically, the bitmap data is RGB image data representing the color of each pixel in RGB values. Each of the three components included in the RGB values, i.e., each of the R value, G value, and B value, is a gradation value having one of 256 gradations from 0 to 255.

In S25 the CPU 110 executes a color conversion process on the RGB image data to generate monochrome image data. The pixel values in the monochrome image data specify the density for each of the plurality of pixels in the image. For example, the color conversion process converts the RGB values for each pixel in the RGB image data to a luminance according to a well-known method of conversion, and subsequently converts the luminance for each pixel to a density. The value for density may be a gradation value in one of 256 levels from 0 to 255, for example.

In S30 the CPU 110 executes a halftone process, such as a process employing the error diffusion method or a dither method, on the monochrome image data to generate dot data as target image data. The dot data represents a dot image that includes a plurality of pixels. The value for each pixel in the dot data specifies the dot formation state for the pixel. Specifically, each pixel in the dot data has one of four values specifying one of the four dot formation states ("large dot," "medium dot," "small dot," and "no dot"). In the following description, the four states "large dot," "medium dot," "small dot," and "no dot" will be abbreviated as "L", "M", "S", and "-", respectively. A printed image is produced on paper by forming dots on the paper at positions corresponding to the plurality of pixels in the dot image, i.e., the plurality of pixels whose pixel values in the dot data specify dots to be formed.

In S35 the CPU 110 generates print data based on the dot data generated in S30. The print data includes feed data FD, and a plurality of pass data PD(1) through PD(q), where q indicates the number of pass processes. One set of pass data corresponds to one pass process. One set of pass data is correlated sets of raster line data for all of the nozzles NZ. Data for one raster line specifies the dot formation state of each pixel in one raster line that includes k number of pixels (where k is an integer greater than or equal to two) aligned in the main scanning direction and corresponding to one nozzle. For example, data for the first raster line in the first set of pass data PD(1) used in the first pass specifies one of the "L", "M", "S", and "-" described above for each of the plurality of pixels in the raster line corresponding to the nozzle NZ having nozzle number "N1". The feed data FD includes q number of values specifying the feed amounts in sheet-conveying processes performed prior to the respective q number of passes. The print data generating process will be described later in greater detail.

In S40 the CPU 110 controls the printing mechanism 200 to execute a printing operation based on the print data generated in S35. Through this process, an image is printed on paper.

According to the above description of the present embodiment, the control device 100 that includes the CPU 110 is an example of the control device, and the printing mechanism 200 is an example of the printer.

A-3. Overview of Multi-Pass Printing

The print data that the CPU 110 generates in the print data generating process in S35 of FIG. 3 is designed for multi-pass printing. Multi-pass printing is a technique for forming dots corresponding to k number of pixels in a single raster line oriented in the main scanning direction by distributing dot formation over Q number of pass processes, where Q is an integer greater than or equal to two. In the present embodiment, Q=3. Hence, the printing apparatus 600 performs what is called three-pass printing. Positions on a sheet of paper that correspond to pixels in a dot image, i.e., positions on the sheet at which dots can be formed during printing, will be called dot-forming positions. The k number of dot-forming positions corresponding to the k number of pixels in the single raster line described above are all at the same position in the sub scanning direction, but different positions in the main scanning direction, and correspond to k number of positions in one line on a sheet of paper. Multi-pass printing is implemented using dot pattern data DPD stored in the nonvolatile storage device 130.

Figure 4:
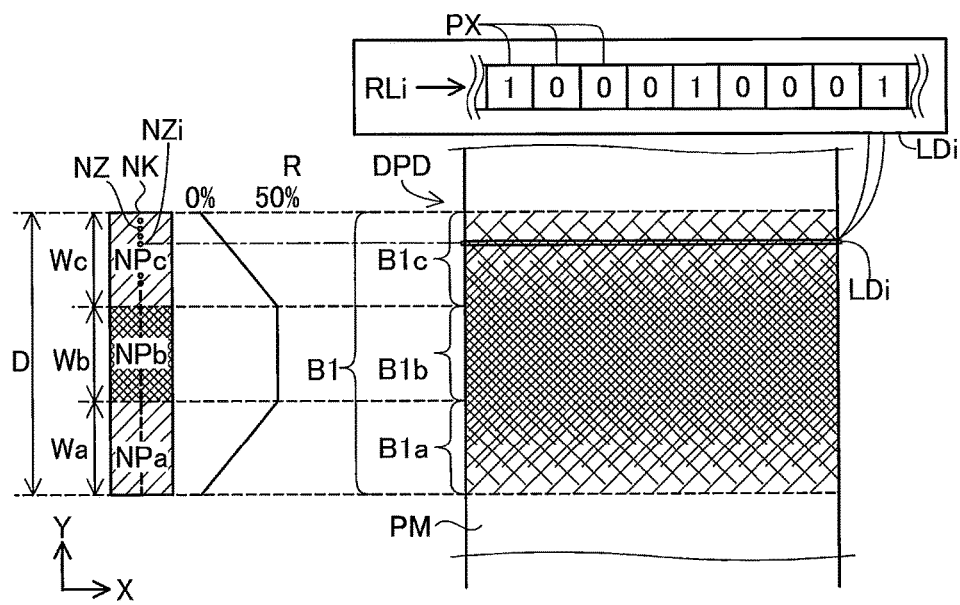
FIG. 4 is an explanatory diagram conceptually illustrating dot pattern data.

Next, the dot pattern data DPD will be described with reference to FIG. 4. FIG. 4 is an explanatory diagram conceptually illustrating the dot pattern data DPD. This dot pattern data DPD is provided for all nozzles NZ within the total nozzle length D of a nozzle row for one color component (the black (K) nozzle row NK, for example). The dot pattern data DPD correlates one line worth of dot pattern data (hereinafter called "line dot pattern data") with each of the nozzles NZ. Line dot pattern data specifies whether to allow dot formation for each pixel in a single raster line that includes a plurality of pixels aligned in the main scanning direction and corresponding one-on-one to individual nozzles. FIG. 4 shows an enlarged view of one portion of the ith line dot pattern data LDi. The ith line dot pattern data LDi stores either a "1" or a "0" for each of the plurality of pixels PX in a raster line RLi corresponding to the ith nozzle NZ (NZi), where the value "1" indicates that dot formation is allowed and value "0" indicates that dot formation is not allowed. In other words, line dot pattern data defines the positions on a sheet PM in the main scanning direction at which dot formation is allowed and at which dot formation is not allowed for corresponding nozzles NZ. The band-like area B1 in FIG. 4 indicates a region on the sheet PM in which dots can be formed in one pass process (hereinafter called a "band area B"). Thus, one could say that the dot pattern data DPD defines dot formation positions in a single band area B at which dot formation is allowed. Further, the band area B can be considered the range (hereinafter called a scanning range) on the paper within which the print head 240 (the nozzles NZ spanning the total nozzle length D) is scanned during a single pass process. The value of each pixel in the dot pattern data DPD ("1" or "0") is called a "mask value."

The graph of a recording rate R in the left side of FIG. 4 shows the relationships between nozzle positions along the conveying direction within the nozzle row NK, and the recording rate R for nozzles NZ at corresponding nozzle positions. The recording rate R of a nozzle NZ specifies the ratio of the number of pixels for which dot formation is allowed to the total number of pixels in the raster line corresponding to the nozzle NZ. Thus, the recording rate R of a nozzle NZ is expressed by NM1/(NM1+NM0), where NM1 denotes the number of "1s" in line dot pattern data corresponding to the nozzle NZ, while NM0 denotes the number of "0s". The "1" values are distributed in each set of line dot pattern data and the total number of the "1" values conforms to the recording rate predefined for the corresponding nozzle NZ. The dot pattern data DPD in the right side of FIG. 4 is depicted using cross-hatching, where denser hatching indicates a higher recording rate R.

The nozzle row NK in the example of FIG. 4 can be divided into three segments NPa, NPb, and NPc that are juxtaposed in the Y-direction (the conveying direction). The second segment NPb in the center region of the nozzle row NK has a recording rate R of 50% irrespective of the nozzle position. The first segment NPa on the upstream side (−Y side) of the second segment NPb has a recording rate R that decreases linearly from 50% to 0% in the −Y direction as the nozzle position changes in the conveying direction. The third segment NPc on the downstream side (+Y side) of the second segment NPb has a recording rate R that decreases linearly from 50% to 0% in the +Y direction as the nozzle position changes in the conveying direction. Thus, the recording rate R employed in the embodiment is a non-uniform recording rate that changes depending on the nozzle position in the conveying direction.

As shown in FIG. 4, the width Wa of the first segment NPa in the conveying direction, the width Wb of the second segment NPb in the conveying direction, and the width Wc of the third segment NPc in the conveying direction are equivalent to each other. These widths Wa, Wb, and Wc in the conveying direction are one-third of the total nozzle length D for the nozzle row NK.

Similarly, the band area B1 in the example of FIG. 4 can be divided into three sections B1a, B1b, and B1c that are juxtaposed in the Y-direction (the conveying direction). When the dots are formed in the band area B1 in one pass process, the first segment NPa of the nozzle row NK forms dots in the upstream (−Y side) section B1a of the band area B1, the second segment NPb of the nozzle row NK forms dots in the midsection B1b of the band area B1, and the third segment NPc of the nozzle row NK forms dots in the downstream (+Y side) section B1c of the band area B1. The length of each of the three sections B1a, B1b, and B1c in the sub scanning direction is one-third the total nozzle length D.

Figure 5:
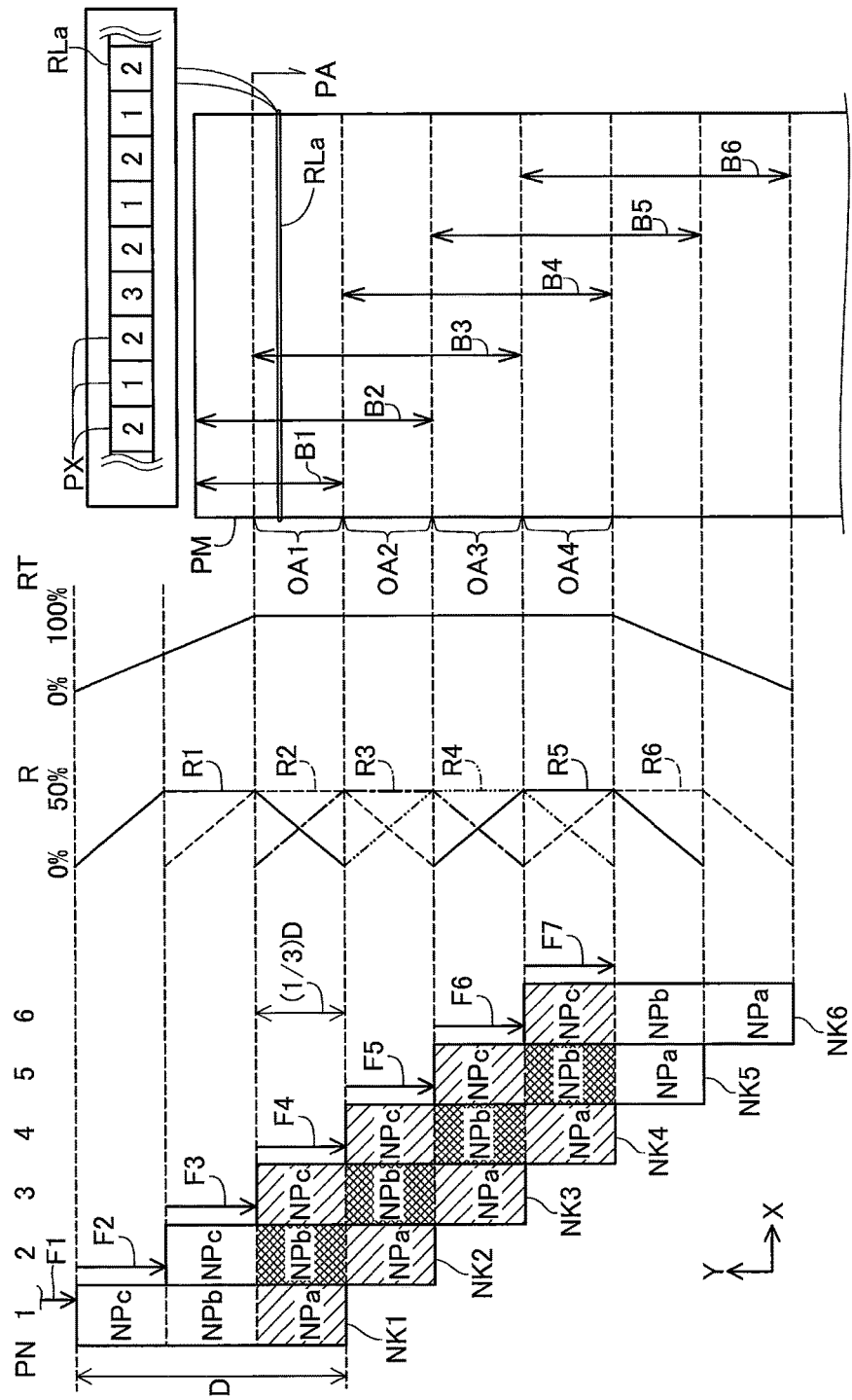
FIG. 5 is a conceptual diagram illustrating three-pass printing according to a first embodiment.

FIG. 5 is a conceptual diagram illustrating three-pass printing according to the embodiment. In FIG. 5, the position of the nozzle row NK relative to the sheet PM in the conveying direction when printing the sheet PM (the position of the print head 240) is specified for each pass process. Pass processes having pass numbers one through six in FIG. 5 are the first through sixth pass processes performed at the start of the printing process. Numbers PN in FIG. 5 denotes the pass numbers. The pass numbers PN indicate the order in which pass processes are executed. The notation NKj indicates the position of the nozzle row NK in the conveying direction (hereinafter called the nozzle position NKj) for the pass process in which the pass number PN is j (i.e., the jth pass process, where j is an integer greater than or equal to one and less than or equal to q). For example, nozzle position NK1 indicates the position of the nozzle row NK in the conveying direction for the first pass process, while nozzle position NK2 indicates the position of the nozzle row NK in the conveying direction for the second pass process. In FIG. 5, PA indicates a printing area in which printing is executed in accordance with the print data.

The first (j=1) conveying process is the process that conveys the sheet PM to its initial position, i.e., the position of the sheet PM for the first pass process. The jth conveying process (2≤j≤q) is the conveying process executed between the (j−1)th pass process and the jth pass process. The notation Fj denotes the jth conveying process. As shown in FIG. 5, the feed amount for the second and subsequent conveying processes Fj is one-third of the total nozzle length D. As is clear from FIG. 5, the position of the nozzle row NK shifts relative to the sheet PM in the direction opposite the conveying direction (−Y direction) each time the conveying process is executed. In the present embodiment, three-pass printing is executed using nozzles over the total nozzle length D for each pass process and equal feed amounts between pass processes.

Further, the notation Bj assigned to band areas indicates the region on the sheet PM in which dots can be formed in the jth pass process (i.e., the scanning range for the jth pass process). For example, a band area B1 denotes the region in which dots can be formed in the first pass process, i.e., by the nozzle row NK at the nozzle position NK1, while a band area B2 denotes the region in which dots can be formed in the second pass process, i.e., by the nozzle row NK at the nozzle position NK2. In the jth pass process, nozzles in the nozzle row NK can be used to form dots on the plurality of raster lines within the band area Bj having different positions in the sub scanning direction (Y-direction).

As shown in FIG. 5, the upstream (−Y side) section of a band area Bs overlaps the midsection of a band area Bs+1 and the downstream (+Y side) section of a band area Bs+2 (where s is an integer greater than or equal to one and less than or equal to q−2). An overlapping area OAs on the sheet PM is the region on the sheet PM in which the band area Bs, band area Bs+1, and band area Bs+2 all overlap. For example, the overlapping area OA1 is the region of the sheet PM at which band area B1, band area B2, and band area B3 overlap each other. The length of an overlapping area OAs in the sub scanning direction is one-third the total nozzle length D.

In other words, dots can be formed in the overlapping area OAs through three pass processes including the sth pass process, the (s+1)th pass process, and the (s+2)th pass process. A different set of nozzles is used in each of the three pass processes for forming dots in the same overlapping area OAs. Specifically, the set of nozzles in the first segment NPa is used to form dots in the overlapping area OAs during the sth pass process; the set of nozzles in the second segment NPb is used to form dots in the overlapping area OAs during the (s+1)th pass process; and the set of nozzles in the third segment NPc is used to form dots in the overlapping area OAs during the (s+2)th pass process.

FIG. 5 also shows a recording rate Rj for each nozzle in the nozzle row NK during the jth pass process, and a total recording rate RT that represents the sum of recording rates Rj at each position on the sheet PM in the conveying direction. For example, the total recording rate RT in the overlapping area OA1 is the sum of the recording rate R1 in the first pass process, the recording rate R2 in the second pass process, and the recording rate R3 in the third pass process. In FIG. 5, the recording rate R1 is depicted with a solid line, the recording rate R2 is depicted with a dashed line, and the recording rate R3 is depicted with a chain line. By setting the recording rate R for the nozzle row NK in each pass process based on the dot pattern data DPD described in FIG. 4, the total recording rate in an overlapping area OAs over three pass processes is 100%. Further, since each pixel in the dot image is assigned to one of the three pass processes in accordance with the dot pattern data DPD, a single dot can be formed at each dot-forming position corresponding to each pixel in the dot image without duplication when performing the three pass processes, excluding the process described later for forcibly outputting dots. Therefore, dots can be formed at all dot-forming positions in an overlapping area OAs through three pass processes. FIG. 5 conceptually illustrates an example of k number of pixels PX in a single raster line RLa included in the printed image (dot image). The raster line RLa is a line extending in the main scanning direction constituting a raster line printed on the sheet PM within the overlapping area OA1. Numbers 1-3 provided in each pixels PX in FIG. 5 denote the pass number for the pass process in which a dot is formed at the kth dot-forming position on the sheet PM corresponding to the kth pixel. This illustrates how dots are formed in each of the first through third pass processes at the k number of dot-forming positions in the raster line RLa corresponding to the k number of pixels PX within the overlapping area OA1.

In the first embodiment described above, the image within an entire overlapping area OAs is printed by forming dots in the overlapping area OAs through three pass processes. For example, the image in the overlapping area OA1 is printed by the first through third pass processes. Similarly, images in the overlapping areas OA2, OA3, and OA4 are printed in the second through fourth, third through fifth, and fourth through sixth pass processes, respectively. Of the three pass processes performed to print an image in an overlapping area OAs in the first embodiment, the initial pass process (sth pass process) will be called the first sub pass process, the second pass process ((s+1)th pass process) will be called the second sub pass process, and the third pass process ((s+2)th pass process) will be called the third sub pass process. In other words, each of the overlapping area OAs (1≤s≤q−2) is printed by forming dots in the overlapping area OAs through three sub pass processes, i.e., the first, second, and third sub pass processes. As shown in FIG. 5, the set of nozzles in the first segment NPa of the nozzle row NK forms dots in the first sub pass process, while the sets of nozzles in the second segment NPb and third segment NPc forms dots in the second sub pass process and third sub pass process, respectively.

A-4. Print Data Generating Process

Figure 6:
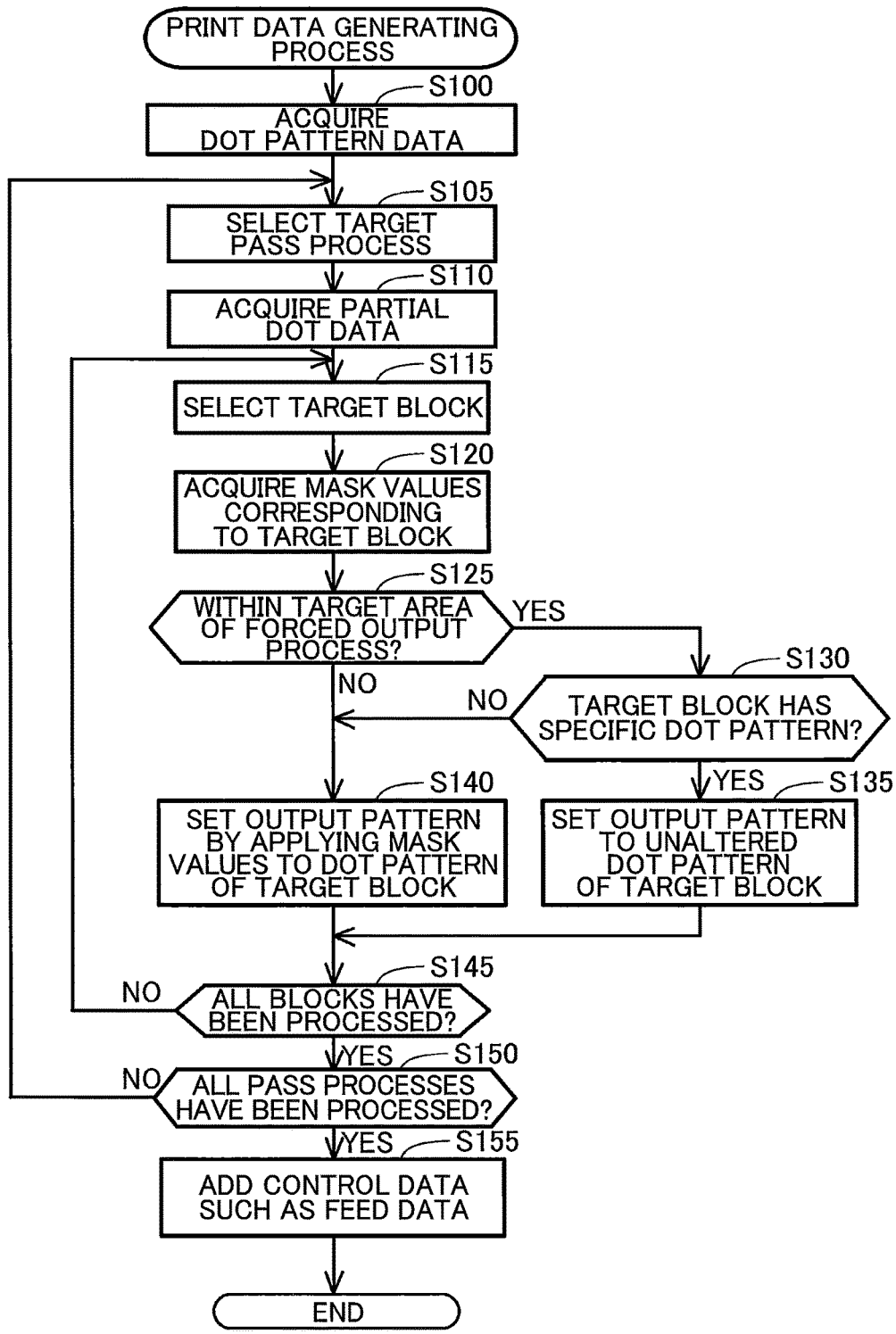
FIG. 6 is a flowchart illustrating steps in a print data generating process executed by the CPU of the control device.
Figure 7A:
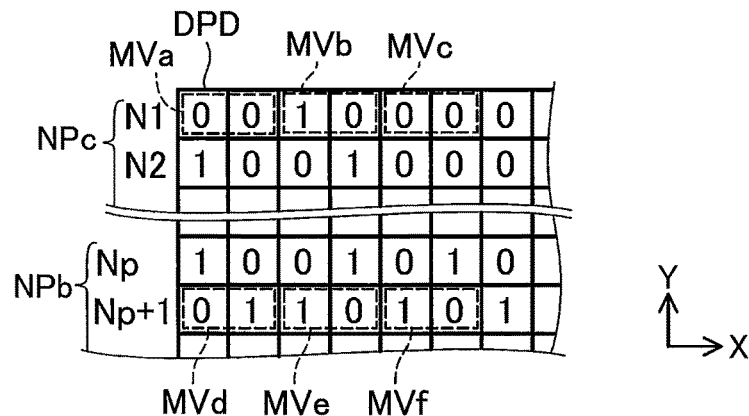
Figure 7B:
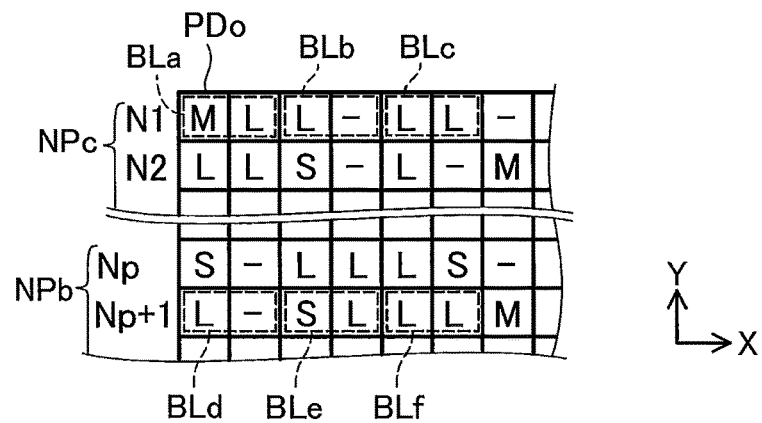
Figure 7C:
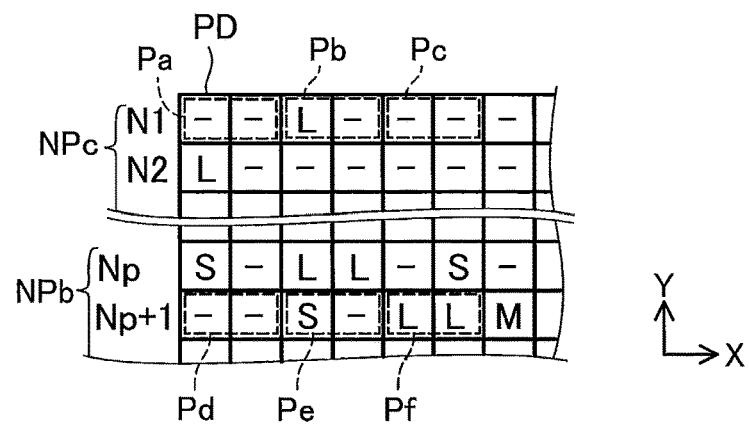

Next, the print data generating process in S35 of FIG. 3 will be described while referring to FIGS. 6, 7A, 7B, and 7C. FIG. 6 is a flowchart illustrating steps in the print data generating process. FIGS. 7A through 7C are explanatory diagrams showing data used in the print data generating process.

In S100 of FIG. 6, the CPU 110 acquires the dot pattern data DPD from the nonvolatile storage device 130. FIG. 7A is an enlarged view showing a portion of the acquired dot pattern data DPD (see FIG. 4). In FIG. 7A, the numbers of nozzles NZ (N1, N2, Np, and Np+1, for example) have been assigned to the corresponding line dot pattern data in the dot pattern data DPD.

In S105 the CPU 110 selects a target pass process from among q number of pass processes used for executing the printing operation. Here, the CPU 110 may select a target pass process in order of the pass numbers PN, for example.

In S110 the CPU 110 acquires partial dot data corresponding to the target pass process from the dot data generated in S30 of FIG. 3. That is, the CPU 110 acquires partial dot data for the plurality of raster lines corresponding to the plurality of nozzles NZ in the nozzle row NK used in the target pass process. FIG. 7B conceptually illustrates a partial dot image PDo represented by the partial dot data acquired in S110. In FIG. 7B, nozzle numbers for nozzles NZ (N1, N2, Np, and Np+1, for example) have been assigned to the corresponding raster lines in the partial dot image PDo (raster lines oriented in the X-direction). The plurality of mask values included in the dot pattern data DPD has a one-on-one correspondence with the plurality of pixels in the partial dot image PDo.

In S115 the CPU 110 selects a target block within the partial dot image PDo. The partial dot image PDo is divided into a plurality of blocks BL, with one block BL comprising two pixels aligned in the X-direction. The example of FIG. 7B shows six blocks BLa through BLf (BLa, BLb, BLc, BLd, BLe, and BLf). For example, the CPU 110 begins from the plurality of blocks BL in the raster line on the +Y side, selecting each block BL in this raster line in order along the X-direction to be the target block. After all blocks BL in the raster line have been processed as the target block, the CPU 110 advances to the plurality of blocks BL in the next raster line on the −Y side of the current raster line, and selects each block BL sequentially along the X-direction to be the target block.

In S120 the CPU 110 acquires mask values corresponding to the target block. Specifically, the CPU 110 acquires two mask values from the dot pattern data DPD that correspond to the two pixels in the target block. FIG. 7A shows pairs of mask values MVa through MVf corresponding to the blocks BLa through BLf in FIG. 7B.

In S125 the CPU 110 determines whether the target block is positioned within a target area of a forced output process. Specifically, the CPU 110 determines that the target block is positioned within a target area for a forced output process when the target block is within an area corresponding to the second segment NPb of the nozzle row NK described above (see FIG. 4), and determines that the target block is positioned outside the target area for a forced output process when the target block is positioned within an area corresponding to either the first segment NPa or the third segment NPc of the nozzle row NK. Since the blocks BLa through BLc are positioned within the area corresponding to the third segment NPc in the example of FIG. 7B, the CPU 110 determines that these blocks are positioned outside the target area for a forced output process. Further, since the blocks BLd through BLf are positioned in the area corresponding to the second segment NPb, the CPU 110 determines that these blocks are positioned in the target area for a forced output process.

If the target block is positioned within the target area for a forced output process (S125: YES), in S130 the CPU 110 determines whether the target block has a specific dot pattern. Here, the dot pattern of a target block signifies the formation pattern of dots specified by the two pixel values in the target block. The specific dot pattern is a pattern in which both pixel values in the target block are the value "L" indicating that a large dot is to be formed. Since the two pixel values in the block BLf are set to (L, L) in the example of FIG. 7B, the CPU 110 determines that the block BLf has the specific dot pattern. Since the pixel values in blocks BLd and BLe have the patterns (L, -) and (S, L), respectively, the CPU 110 determines that blocks BLd and BLe do not have the specific dot pattern. Clearly, a target block whose pixel values are (L, L) has a higher density than a target block having a different combination of pixel values ((S, L) or (L, -), for example). In other words, a target block having the specific dot pattern indicates that the density of the target block is higher than a reference.

If the target block is not positioned in the target area for the forced output process (S125: NO) or if the dot pattern of the target block is not the specific dot pattern (S130: NO), the CPU 110 advances to S140. However, if the target block is positioned within the target area for the forced output process (S125: YES) and the dot pattern of the target block is the specific dot pattern (S130: YES), the CPU 110 advances to S135.

In S135 the CPU 110 sets the output pattern to the unaltered dot pattern of the target block. That is, the CPU 110 sets the two pixel values corresponding to the pass data PD to the same two pixel values in the target block, without consideration for whether the mask values corresponding to the two pixels in the target block are "1" or "0". In the example of FIGS. 7A through 7C, the CPU 110 sets the values of the two pixels Pf corresponding to the pass data PD in FIG. 7C to the unaltered values (L, L) of the two pixels in block BLf of FIG. 7B. Thus, in S135 the CPU 110 sets the two pixel values in the pass data PD corresponding to the target block to the value "L" indicating that a large dot is to be formed, even when the corresponding mask values are the value "0" indicating that dot formation is not allowed. Hence, the process in S135 for setting the two pixel values in the pass data PD corresponding to the target block to "L" is called "forced output of dots."

In S140 the CPU 110 sets the output pattern by applying the corresponding mask values to the dot pattern in the target block. That is, when the mask value in the dot pattern data DPD corresponding to a pixel in the target block is "1", the CPU 110 sets the corresponding pixel value in the pass data PD to the value of the pixel in the target block. When the mask value in the dot pattern data DPD corresponding to a pixel in the target block is "0", the CPU 110 sets the corresponding pixel value in the pass data PD to the value "-" indicating that a dot is not to be formed, regardless of the value of the pixel in the target block. In the example of FIGS. 7A through 7C, since the values for the two pixels in block BLd in FIG. 7B are (L, -) and the corresponding mask values MVd in FIG. 7A are (0, 1), the CPU 110 sets the values of the two corresponding pixels Pd in the pass data PD of FIG. 7C to (-, -). Further, since the two pixel values in block BLe of FIG. 7B are (S, L) and the corresponding mask values MVe in FIG. 7A are (1, 0), the CPU 110 sets the values of the two corresponding pixels Pe in the pass data PD of FIG. 7C to (S, -).

In S145 the CPU 110 determines whether all blocks BL in the partial dot image PDo have been processed as target blocks. If there remain unprocessed blocks BL (S145: NO), the CPU 110 returns to S115 and selects an unprocessed block BL as a target block. If all blocks BL have been processed (S145: YES), the CPU 110 advances to S150.

In S150 the CPU 110 determines whether all q number of pass processes have been processed as the target pass process. If there remain unprocessed pass processes (S150: NO), the CPU 110 returns to S105 and selects an unprocessed pass process as a target pass process. When all pass processes have been processed (S150: YES), the CPU 110 advances to S155.

In S155 the CPU 110 generates print data by adding control data such as feed data FD specifying feed amounts for the q number of conveying processes performed prior to the corresponding q number of pass processes to the q number of pass data generated above. After generating the print data, the CPU 110 ends the print data generating process.

Figure 8A:
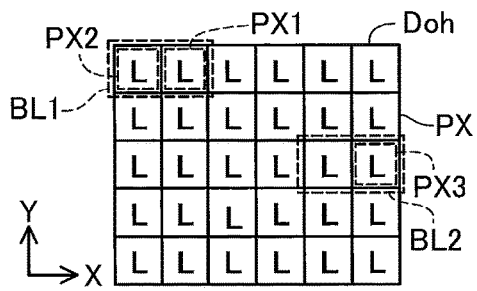
FIGS. 8A through 8G are explanatory diagrams for printing of a high-density image, and in which FIG. 8A conceptually illustrates a high-density dot image represented by dot data.

Next, a printing operation implemented according to the above control process according to the first embodiment will be described. FIGS. 8A through 8G are explanatory diagrams for the printing of a high-density image. FIG. 8A conceptually illustrates a high-density dot image Doh represented by dot data. In this dot image Doh, the values of all pixels PX are the value "L" indicating the formation of a large dot. This dot image Doh is an image to be printed in the overlapping area OA1 of FIG. 5, for example, and is printed using three sub pass processes, as described above (see FIG. 5).

Figure 8D:
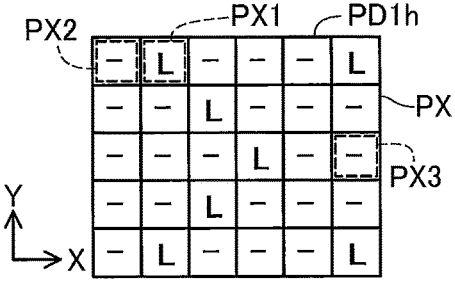
Figure 8B:
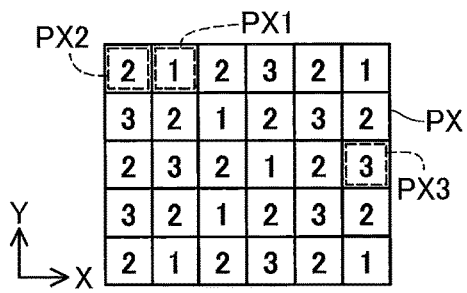

FIG. 8B indicates the sub pass process for each of the pixels PX in the dot image Doh used to form a dot at a position on the sheet PM corresponding to the pixel PX. In FIG. 8B, the first of the three sub pass processes described above forms dots at positions corresponding to pixels PX assigned a "1", while dots are formed at positions corresponding to pixels PX assigned a "2" or a "3" using the second and third sub pass processes, respectively. Here, pixels PX assigned values "1", "2", and "3" will be respectively called first pixels, second pixels, and third pixels. As an example, pixels PX1, PX2, and PX3 in the dot image Doh respectively denote one of the first pixels, second pixels, and third pixels. Hence, dots are formed at dot-forming positions on the sheet PM corresponding to the pixels PX1, PX2, and PX3 in the corresponding first sub pass process, second sub pass process, and third sub pass process. As indicated by the recording rate R described in FIG. 4, the ratio of second pixels to the total number of pixels PX in the dot image Doh is 50%.

The positions of the pluralities of first pixels, second pixels, and third pixels in the dot image Doh are defined by the dot pattern data DPD described above (see FIG. 4). That is, mask values of "1" in the dot pattern data DPD that correspond to nozzles in the first segment NPa specify the positions of first pixels. Similarly, mask values of "1" in the dot pattern data DPD that correspond to nozzles in the second segment NPb specify positions of second pixels, and mask values of "1" in the dot pattern data DPD that correspond to nozzles in the third segment NPc specify positions of third pixels.

Figure 8E:
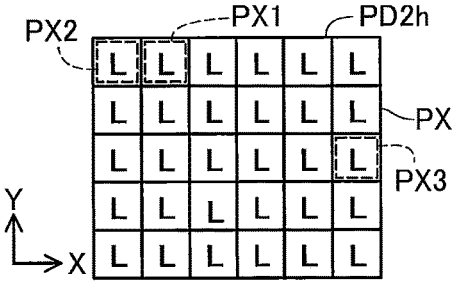
Figure 8C:
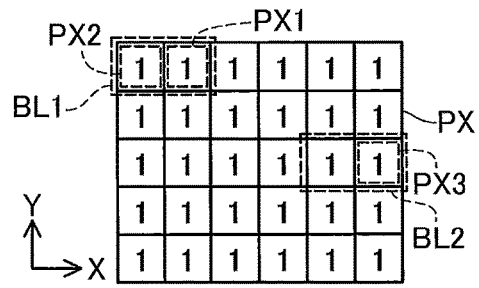

FIG. 8C indicates which of the plurality of pixels PX in the dot image Doh are targets for forced output in the second sub pass process (the pass process performed using nozzles in the second segment NPb, which is the subject of the forced output process). In FIG. 8C, pixels PX assigned a "1" are targets of forced output. In the example of FIG. 8C, a "1" is assigned to all pixels PX, indicating that all pixels PX are targets for forced output because the dot patterns in all blocks BL in the dot image Doh are the specific dot pattern (L, L), as shown in FIG. 8A.

FIG. 8D shows first sub pass data PD1h corresponding to the dot image Doh. The first sub pass data PD1h is pass data PD for the first sub pass process and constitutes pass data PD associated with nozzles in the first segment NPa. The first sub pass process is executed using nozzles in the first segment NPa and is not subjected to the forced output process (see S125 of FIG. 6). Accordingly, dots are not forcibly outputted in the first sub pass process. Therefore, only pixels PX having a value in the dot image Doh of FIG. 8A indicating that a dot is to be formed ("L", for example) and that are assigned a "1" in FIG. 8B have a value in the first sub pass data PD1h indicating that a dot is to be formed. Pixels PX having a value in the dot image Doh indicating that a dot is not to be formed ("-") and pixels PX assigned a "2" or a "3" in FIG. 8B have a value in the first sub pass data PD1h indicating that a dot is not to be formed. For example, all of the pixels PX1, PX2, and PX3 in the dot image Doh have a value indicating that a dot is to be formed (see FIG. 8A), but only pixel PX1 of these three pixels has a value in the first sub pass data PD1h indicating that a dot is to be formed (FIG. 8D). The values for pixels PX2 and PX3 in the first sub pass data PD1h indicate that a dot is not to be formed.

FIG. 8E shows second sub pass data PD2h corresponding to the dot image Doh. The second sub pass data PD2h is pass data PD for the second sub pass process and is pass data PD associated with nozzles in the second segment NPb. Since the second sub pass process is executed using nozzles in the second segment NPb, the second sub pass process is subject to the forced output process (see S125 of FIG. 6). Accordingly, dots may be forcibly outputted in the second sub pass process. Therefore, pixels PX that satisfy any of conditions (α) and (β) below have values in the second sub pass data PD2h that indicate a dot is to be formed.

(α) The pixel PX has a value in the dot image (the dot image Doh in FIG. 8A, for example) indicating that a dot is to be formed ("S", "M", or "L", for example) and is assigned a "2" in FIG. 8B.

(β) The pixel PX has a value in the dot image (the dot image Doh in FIG. 8A, for example) indicating that a dot is to be formed ("L", for example) and is assigned a "1" in FIG. 8C.

Pixels that satisfy only condition (α) are not subjected to forced output but have dot formation set based on the corresponding mask values in the dot pattern data DPD. Pixels that satisfy condition (β) are subjected to forced output and are set to have a dot formed irrespective of the corresponding mask value in the dot pattern data DPD. As described in S130 of FIG. 6, a pixel PX that satisfies condition (β) in the present embodiment belongs to a block BL having the specific dot pattern (L, L). Hence, in the present embodiment, pixels PX that satisfy condition (β) always have the value "L" specifying a large dot is to be formed.

In the example of FIGS. 8A through 8G, all pixels PX satisfy condition (β) described above since all pixels PX are targets for forced output, as indicated in FIG. 8C. Hence, all pixels PX in the second sub pass data PD2h of FIG. 8E have the value "L" indicating a large dot is to be formed. For example, pixels PX1, PX2, and PX3 in the second sub pass data PD2h have a value specifying a dot is to be formed (see FIG. 8E).

Figure 8F:
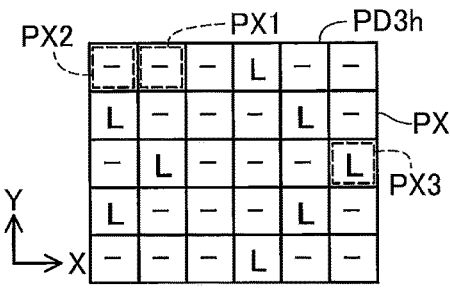

FIG. 8F shows third sub pass data PD3h corresponding to the dot image Doh. The third sub pass data PD3h is pass data PD for the third sub pass process and is associated with nozzles in the third segment NPc. Since the third sub pass process is executed using the nozzle set in the third segment NPc, the third sub pass process is not subjected to the forced output process. Accordingly, as with the first sub pass process, dots are not forcibly outputted in the third sub pass process. Therefore, only pixels PX in the dot image Doh having a value indicating that a dot is to be formed ("L", for example) and that are assigned a "3" in FIG. 8B have a value in the third sub pass data PD3h indicating that a dot is to be formed. Pixels PX in the dot image Doh of FIG. 8A having a value indicating that a dot is not to be formed ("-") and pixels PX assigned a "1" or "2" in FIG. 8B have values in the third sub pass data PD3h indicating that a dot is not to be formed. For example, the pixel PX3 has a value in the third sub pass data PD3h indicating that a dot is to be formed while pixels PX1 and PX2 have values indicating that dots are not to be formed.

Figure 8G:
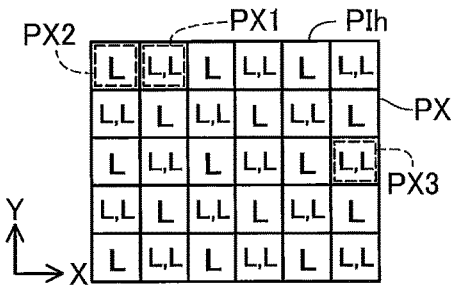

FIG. 8G conceptually illustrates a printed image PIh that is printed according to the three sets of sub pass data PD1h, PD2h, and PD3h in FIGS. 8D through 8F. At each position on the sheet PM corresponding to pixels PX assigned the "L" (pixel PX2 in FIG. 8G, for example), a large dot is formed in only one of the first through third sub pass processes. At each position on the sheet PM corresponding to pixels PX assigned "L, L" (pixels PX1 and PX3 in FIG.

8G, for example), one large dot is formed in either the first sub pass process or third sub pass process, and another large dot is formed through forcible output in the second sub pass process. Hence, two large dots are formed so as to overlap each other at each position on the sheet PM corresponding to pixels PX assigned "L, L".

FIGS. 9A through 9F are explanatory diagrams illustrating the printing of a medium-density image. FIG. 9A conceptually illustrates a medium-density dot image Dom represented by dot data. The dot image Dom is an image having lower density than the dot image Doh in FIG. 8A and includes pixels having values "L", "M", and "S" specifying the formation of large, medium, and small dots, respectively, and values "-" indicating a dot is not to be formed.

The dot image Dom is printed through three sub pass processes just like the dot image Doh (see FIG. 5). The numbers shown in FIG. 8B indicate the pass processes used to form dots at positions on the sheet PM corresponding to the pixels PX in the dot image Dom.

FIG. 9B indicates which of the pixels PX in the dot image Dom that are targets for forced output in the second sub pass process. Pixels PX assigned a "1" in FIG. 9B are subjected to forced output while pixels PX assigned a "0" are not. In the example of FIGS. 9A through 9F, only the middle block BLm in FIG. 9A has the specific dot pattern (L, L). Accordingly, only the two pixels PX corresponding to the middle block BLm are subjected to forced output. All pixels PX other than these two pixels are not subjected to forced output. Thus, this example of a relatively low-density dot image Dom differs greatly with regard to forced output from the example of the relatively high-density dot image Doh (FIG. 8C) in which all pixels PX are subjected to forced output.

FIGS. 9C, 9D, and 9E respectively show first sub pass data PD1$m$, second sub pass data PD2$m$, and third sub pass data PD3$m$ corresponding to the dot image Dom. The first sub pass data PD1$m$, second sub pass data PD2$m$, and third sub pass data PD3$m$ are pass data PD for the first sub pass process, second sub pass process, and third sub pass process, respectively. As described in FIGS. 8A through 8G, dots are not forcibly outputted in the first sub pass process and third sub pass process. Therefore, only pixels PX having a value in the dot image Dom of FIG. 9A indicating that a dot is to be formed (one of the "L", "M", and "S", for example) and assigned a "1" or a "3" in FIG. 8B has a value in the first sub pass data PD1$m$ or third sub pass data PD3$m$ indicating that a dot is to be formed (FIGS. 9C and 9E).

However, since the second sub pass process is subjected to a forced output process as described in FIGS. 8A through 8G, dots may be forcibly outputted in the second sub pass process. Therefore, pixels PX in the second sub pass data PD2$m$ that satisfy conditions ($\alpha$) and ($\beta$) described above have values indicating that a dot is to be formed.

In the example of FIGS. 9A through 9F, only the two pixels PX corresponding to the middle block BLm are subjected to forced output, as shown in FIG. 9B. Accordingly, the two pixels PX corresponding to the middle block BLm are set to the value "L", indicating that a large dot is to be formed, in the second sub pass data PD2$m$ in FIG. 9D. All other pixels PX are set to a value specifying that a dot is to be formed (one of the "L", "M", and "S") when condition ($\alpha$) is satisfied, or set to the value "-" specifying that a dot is not to be formed when neither condition ($\alpha$) or ($\beta$) is satisfied.

For example, pixels PX1, PX2, and PX3 in the dot image Dom have values specifying that dots are to be formed (see FIG. 9A), but only the pixel PX1 of these three pixels has a value in the first sub pass data PD1$m$ specifying that a dot is to be formed (see FIG. 9C). Further, only pixel PX2 of these three pixels has a value in the second sub pass data PD2$m$ specifying that a dot is to be formed (see FIG. 9D). Further, only pixel PX3 of these three pixels has a value in the third sub pass data PD3$m$ specifying that a dot is to be formed (see FIG. 9E).

FIG. 9F conceptually illustrates a printed image P1$m$ that is printed according to these three sets of sub pass data PD1$m$, PD2$m$, and PD3$m$ in FIGS. 9C through 9E. Large, medium, and small dots are formed at positions on the sheet PM corresponding to pixels PX assigned the values "L", "M", and "S", respectively, in one of the first through third sub pass processes. However, two large dots are formed to overlap each other at positions on the sheet PM corresponding to pixels PX assigned "L, L" (pixel PXm in the example of FIG. 9F) through two sub pass processes, as described above. The probability that large dots will be superimposed on each other in this way is high (50% maximum) when printing an image of relatively high density (the dot image Doh in FIG. 8A, for example). However, such large dots are rarely superimposed when printing an image of relatively low density (the dot image Dom in FIG. 9A, for example).

In the first embodiment described above, the CPU 110 generates print data in the print data generating process in S35 of FIG. 3 and controls the printing mechanism 200 to print an image based on this print data. During the printing process, the CPU 110 controls the printing mechanism 200 to execute the sth pass process (an example of the first forming process; the first pass process of FIG. 5, for example) and to subsequently execute the (s+1)th pass process (an example of the second forming process; the second pass process in FIG. 5, for example). Part of the sth scanning range in the sth pass process (an example of the first scanning range; the band area B1 in FIG. 5, for example) overlaps part of the (s+1)th scanning range in the (s+1)th pass process (an example of the second scanning range; the band area B2 in FIG. 5, for example). The overlapping area on the sheet PM in which the sth scanning range and (s+1)th scanning range overlap (the overlapping area OA1 in FIG. 5, for example) includes first positions corresponding to the first pixels in the dot image Doh or Dom (pixel PX1, for example) and second positions corresponding to the second pixels in the dot image Doh or Dom (pixel PX2, for example; see FIGS. 8A and 9A). The sth pass process forms dots in the overlapping area on the sheet PM as the first sub pass process, and the (s+1)th pass process subsequently forms dots in the overlapping area as the second sub pass process.

In the dot data representing the high-density dot image Doh in the example of FIGS. 8A through 8G, the values of the first pixel PX1 and second pixel PX2 specify that a dot is to be formed (a large dot in the example of FIG. 8A), and the dot data satisfies a specific condition requiring that the density in a block BL1 that includes the first pixel be at least a reference (see FIG. 8A). The specific condition in the present embodiment requires that the values of the two pixels in the block BL1 including the first pixel PX1 have the specific dot pattern (L, L), as described above. As is clear from the first sub pass data PD1$h$ in FIG. 8D, the CPU 110 forms a dot (a large dot in the example of FIGS. 8A through 8G) at a first position corresponding to the first pixel PX1 in the first sub pass process, but does not form a dot at a second position corresponding to the second pixel PX2. As is clear from the second sub pass data PD2$h$ in FIG. 8E, the CPU 110 forms dots (large dots in the example of FIGS. 8A through 8G) at both the first position corresponding to the first pixel PX1 and the second position corresponding to the second pixel PX2 in the second sub pass process.

As a result, dots are formed at first positions on the sheet PM in the first sub pass process and dots are formed at second positions on the sheet PM in the second sub pass process. Further, if the dot data satisfies the specific condition, dots are also formed at the first positions in the second sub pass process. Thus, when a first position falls in a region of the printed image having a relatively high density, dots are formed at the first position in both the first and second sub pass processes. This method can reduce the likelihood of a drop in density in the printed image PIh (see FIG. 8G) due to positional deviation between dots formed in the first sub pass process and dots formed in the second sub pass process.

Figure 10A:
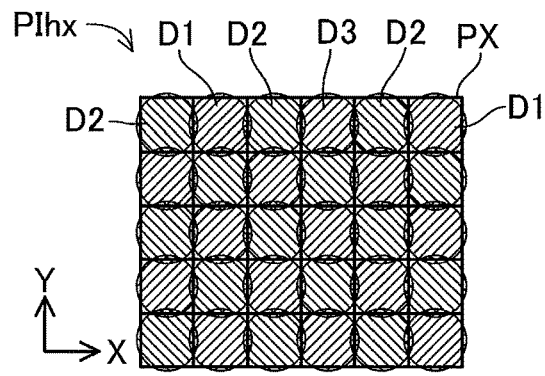
Figure 10B:
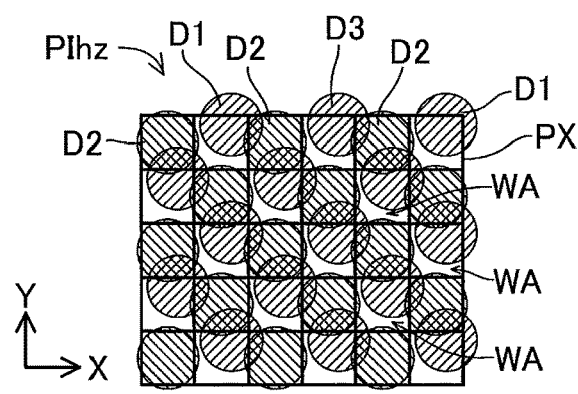
Figure 10C:
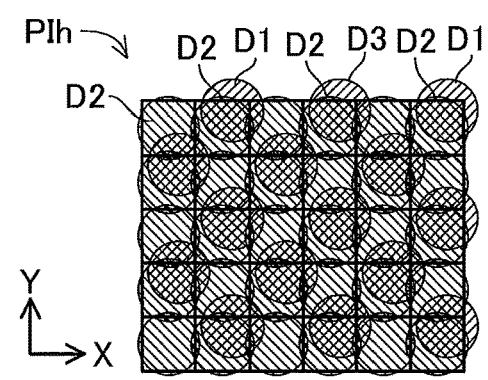

FIGS. 10A through 10C are explanatory diagrams representing a printed image formed on the sheet PM with a plurality of dots. FIG. 10A shows a printed image PIhx serving as a comparative example. The printed image PIhx corresponds to the high-density dot image Doh shown in FIG. 8A. In the printed image PIhx, unlike in the printed image PIh of the present embodiment shown in FIG. 8G, two large dots are not formed in two sub pass processes so as to overlap the dots at a single dot-forming position corresponding to a single pixel. Rather, in the printed image PIhx, a single large dot is formed at the dot-forming position corresponding to each pixel in the sub pass process specified for the pixel in FIG. 8B (one of the first sub pass process, second sub pass process, and third sub pass process). For example, large dots D1 are formed in the first sub pass process, while large dots D2 and D3 are formed in the second sub pass process and third sub pass process, respectively. In the printed image PIhx shown in FIG. 10A, each large dot is formed at an ideal position on the sheet PM, with no positional deviation.

FIG. 10B shows a printed image PIhz of a comparative example. In the printed image PIhz, the positions of the large dots D2 formed in the second sub pass process are offset relative to the large dots D1 and D3 formed in the first and third sub pass processes. Among this relative positional offset, offset in the sub scanning direction (Y-direction) may be caused by irregular feed amounts for the sheet PM, for example, while offset in the main scanning direction (X-direction) may be caused by irregular timing for ejecting ink from nozzles NZ during pass processes.

In the printed image PIhz shown in FIG. 10B, this relative offset among large dots increases the amount of overlapping area between the large dots D1 and D3 formed in the first and third sub pass processes and the large dots D2 formed in the second sub pass process. Consequently, the area on the sheet PM in which dots are not formed (the white area WA) increases by the amount of increase in the overlapping area. Thus, the relative offset among large dots occurring in the printed image PIhz of FIG. 10B results in a lower density than that of the printed image PIhx in FIG. 10A in which positional deviation does not occur. This decrease in density in a high-density image leads to a drop in image quality.

FIG. 10C is an explanatory diagram representing the printed image PIh of the present embodiment (see FIG. 8G) rendered with a plurality of dots. In this printed image PIh, the positions of the large dots D2 are offset relative to the large dots D1 and D3, as in the printed image PIhz of FIG. 10B. However, large dots D2 are formed through forcible output in the second sub pass process to overlap the large dots D1 and D3 formed in the first and third sub pass processes. Consequently, there is no increase in the white area WA in which dots are not formed on the sheet PM. Accordingly, the density of a high-density image does not decrease, even when the positions of the large dots D2 relative to the large dots D1 and D3 become offset.

Further, in the example of FIGS. 9A through 9F of the first embodiment in which dot data represents a medium-density dot image Dom, the values of the first pixel PX1 and second pixel PX2 indicate that a dot (a medium dot in the example of FIGS. 9A through 9F) is to be formed (FIG. 9A). This dot data does not satisfy the specific condition requiring the density in block BL1 that includes the pixel PX1 to be at least a reference. In this case, as shown in the first sub pass data PD1m of FIG. 9C, the CPU 110 forms a dot (a medium dot in the example of FIGS. 9A through 9F) at the first position corresponding to the first pixel PX1 in the first sub pass process, but does not form a dot at the second position corresponding to the second pixel PX2. As shown in the second sub pass data PD2m in FIG. 9D, the CPU 110 does not form a dot at the first position corresponding to the first pixel PX1 in the second sub pass process, but forms a dot (medium dot in the example of FIGS. 9A through 9F) at the second position corresponding to the second pixel PX2. Thus, when printing the dot image Dom having a relatively low density, the method of the embodiment avoids forming two dots that overlap at a single dot-forming position. In other words, dots are distributed more sparsely when forming the dot image Dom having a relatively low density. Hence, even if relative offset among dots occurs when printing the dot image Dom having the relatively low density, the area of overlap between dots formed in the first and third sub pass processes and dots formed in the second sub pass process is unlikely to increase. Therefore, relative offset among dots is not likely to increase the white area WA on the sheet PM in which dots are not formed and, hence, is unlikely to decrease the density of the image. Consequently, there is no need to form dots that overlap. Conversely, overlapping dots when printing the dot image Dom could excessively increase the density of the printed image to a density higher than that specified by the dot data. This problem is avoided in the first embodiment by not forming dots that overlap each other when the specific condition is not met.

As described above, the first sub pass process according to the first embodiment uses the set of nozzles in the first segment NPa constituting part of the nozzle row NK within the total nozzle length D to form dots in an overlapping area OAs. Further, the second sub pass process uses the set of nozzles in the second segment NPb to form dots in the overlapping area OAs, while the third sub pass process uses the set of nozzles in the third segment NPc to form dots in the overlapping area OAs (see FIG. 5). Printing the image in three sub pass processes can suppress the occurrence of banding in the printed image, for example.

In the first embodiment, the recording rate R of the nozzles in the second segment NPb used to form dots in the second sub pass process is approximately 50%, as shown in FIG. 5. That is, the ratio of the number of second pixels (pixels corresponding to the second sub pass process) to the total number of pixels in an area of the dot image corresponding to the overlapping area OA1 on the sheet PM is approximately 50%. When the ratio of dots formed in the second sub pass process is 50% in this way, the ratios of other dots (dots formed in the first sub pass process and third sub pass process) are also 50%. This method is more susceptible to a decrease in density caused by relative positional offset between large dots formed in the second sub pass process and other dots. In the present embodiment, pixels PX corresponding to nozzles in the second segment NPb whose recording rate R is approximately 50% are targeted for forcible output when the specific condition is met. Thus, the method of the embodiment can suitably suppress a decrease in density when such a decrease is likely to occur due to relative offset among dots.

In the first embodiment, the CPU 110 determines that the dot data satisfies the specific condition (S130 of FIG. 6) when the values of pixels in a block BL1 including the first pixel PX1 have the specific dot pattern (L, L). Thus, the CPU 110 can suitably determine whether the specific condition requiring the density in a block to be greater than or equal to a reference has been satisfied according to the values of pixels in the dot data.

More specifically, the block BL1 is a region corresponding to the first pixel PX1 and a pixel adjacent to the first pixel PX1 (see FIG. 8A), and the specific dot pattern is a pattern in which the value of the first pixel PX1 specifies formation of a large dot while the value of the adjacent pixel also specifies formation of a large dot (i.e., L, L). Thus, the CPU 110 can suitably determine whether the specific condition has been met according to the values of two adjacent pixels.

In the present embodiment, the CPU 110 controls the printing mechanism 200 to execute the (s+2)th pass process (an example of the third forming process; the third pass process of FIG. 5, for example) following the (s+2) pass process. Part of the (s+2)th scanning range in the (s+2)th pass process (an example of the third scanning range; the band area B3 in FIG. 5, for example) overlaps part of the sth scanning range described above (the band area B1 in FIG. 5, for example) and part of the (s+1)th scanning range described above (the band area B2 in FIG. 5, for example). The overlapping area on the sheet PM in which the sth, (s+1)th, and (s+2)th scanning range overlap one another (the overlapping area OA1 in FIG. 5, for example) includes a third position corresponding to the third pixel PX3 in the dot image Doh or Dom in addition to a first position corresponding to the first pixel PX1 in the dot image Doh or Dom and a second position corresponding to the second pixel PX2 (see FIGS. 8A and 9A). The sth pass process forms dots in the overlapping area on the sheet PM as the first sub pass process, the (s+1)th pass process subsequently forms dots in the overlapping area as the second sub pass process, and the (s+2)th pass process further forms dots in the overlapping area as the third sub pass process.

In the example of dot data in FIGS. 8A through 8G representing the high-density dot image Doh, the values of both the second pixel PX2 and third pixel PX3 indicate that a dot (a large dot in the example of FIGS. 8A through 8G) is to be formed (see FIG. 8A), and the dot data satisfies the specific condition requiring the density in a block BL2 that includes the third pixel PX3 to be at least the reference (see FIG. 8A). In this case, the CPU 110 forms dots (large dots in the example of FIGS. 8A through 8G) through the second sub pass process at the second position corresponding to the second pixel PX2 and the third position corresponding to the third pixel PX3, as can be seen in the second sub pass data PD2h of FIG. 8E. Next, the CPU 110 forms a dot (a large dot in the example of FIGS. 8A through 8G) through the third sub pass process at the third position corresponding to the third pixel PX3 but does not form a dot at the second position corresponding to the second pixel PX2, as can be seen in the third sub pass data PD3h of FIG. 8F. Thus, when performing three-pass printing for printing the overlapping area OA1 using three sub pass processes, the method of the disclosure can suppress a drop in density in the printed image PIh caused by relative offset among dots formed in the three sub pass processes.

Further, in the example of dot data in FIGS. 9A through 9F representing the medium-density dot image Dom, the values of the second pixel PX2 and third pixel PX3 indicate a dot (a medium dot in the example of FIGS. 9A through 9F) is to be formed (see FIG. 9A), and the dot data does not satisfy the specific condition requiring that the density in the block BL2 that includes the third pixel PX3 be at least the reference. At this time, the CPU 110 forms a dot (a medium dot in the example of FIGS. 9A through 9F) through the second sub pass process at the second position corresponding to the second pixel PX2 but does not form a dot at the third position corresponding to the third pixel PX3, as is clear from the second sub pass data PD2m in FIG. 9D. Next, the CPU 110 forms a dot (a medium dot in the example of FIGS. 9A through 9F) through the third sub pass process at the third position corresponding to the third pixel PX3, but does not form a dot at the second position corresponding to the second pixel PX2, as is clear in the third sub pass data PD3m in FIG. 9E. Thus, if the specific condition is not satisfied when performing three-pass printing, the CPU 110 does not form dots so as to overlap each other, thereby suppressing an excessive increase in density in the actual printed image compared to the density specified in the dot data.

In S120 of FIG. 6, the CPU 110 acquires mask values for the target pixels (the two pixels in the target block) from the dot pattern data DPD. In S140 of FIG. 6, the CPU 110 sets an output pattern by applying the mask values from the dot pattern data DPD. Through this process, if a target pixel is present at the position of a first pixel specified in the dot pattern data DPD and the value of the target pixel in the dot data specifies that a dot is to be formed, the CPU 110 implements a process to form a dot at the position on the sheet PM corresponding to the target pixel in the first sub pass process. If a target pixel is present at the position of a second pixel specified in the dot pattern data DPD and the value of the target pixel in the dot data indicates that a dot is to be formed, the CPU 110 implements a process for forming a dot at the position on the sheet PM corresponding to the target pixel in the second sub pass process. Accordingly, the CPU 110 can form dots suitably in the first sub pass process and second sub pass process according to the dot pattern data DPD and the dot data.

The plurality of pixels in a raster line extending in the X-direction includes first pixels corresponding to the first sub pass process (pixels assigned a "1" in FIG. 8B), second pixels corresponding to the second sub pass process (pixels assigned a "2" in FIG. 8B), and third pixels corresponding to the third sub pass process (pixels assigned a "3" in FIG. 8B). Hence, first positions on the sheet PM corresponding to first pixels and second positions on the sheet PM corresponding to second pixels occupy a plurality of positions on a single raster line in the printed image having the same position in the sub scanning direction (Y-direction) but different positions in the main scanning direction (X-direction). Thus, a plurality of dots to be formed on a single line oriented in the main scanning direction is formed in a plurality of pass processes. This type of printing is called "shingling" and can suppress the occurrence of banding in the printed image.

According to the present embodiment, the CPU 110 forms dots in an overlapping area OAs using three sub pass processes. The length of each overlapping area in the sub scanning direction is one-third the total nozzle length D of the nozzle row NK. In this way, the entire region to be printed can be printed without gaps through three sub pass processes, thereby suppressing unevenness in the printed image.

B. Second Embodiment

Figure 11:
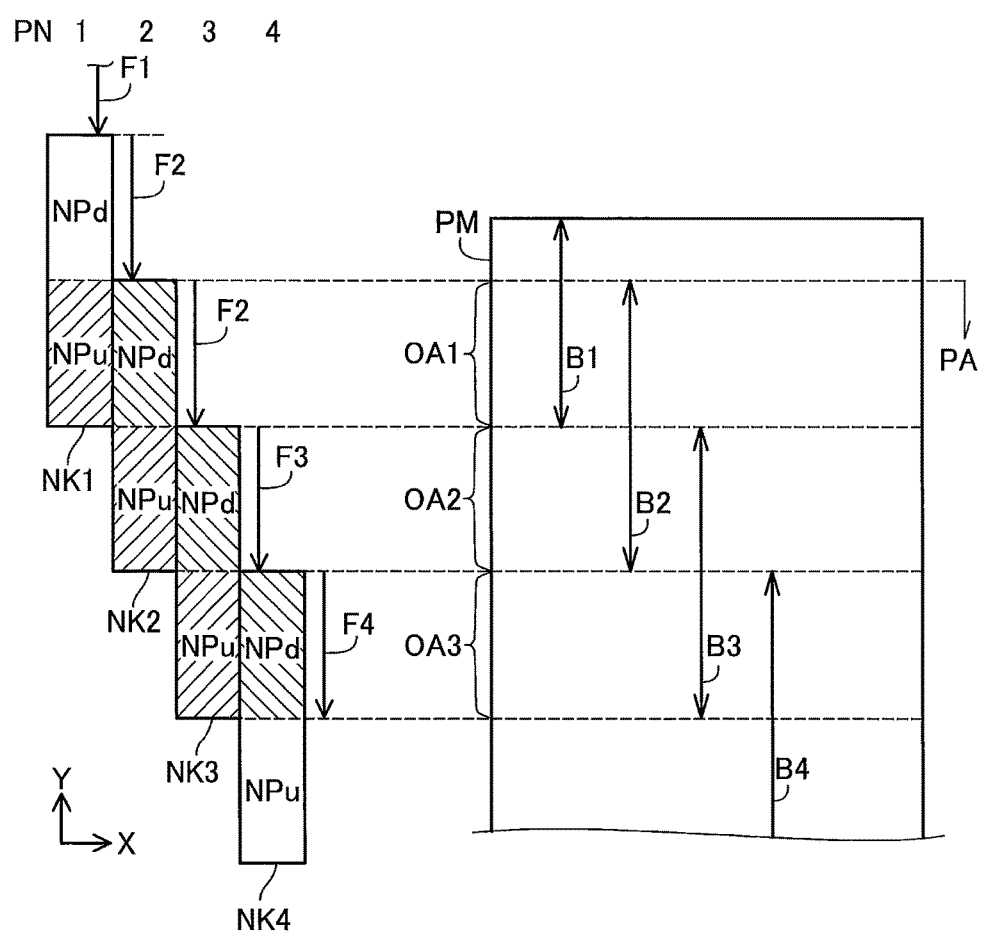
FIG. 11 is a conceptual diagram illustrating two-pass printing according to a second embodiment.

In a second embodiment of the present disclosure, the printing apparatus 600 performs two-pass printing for forming dots corresponding to k number of pixels in a single raster line oriented in the main scanning direction by distributing dot formation over two pass processes. FIG. 11 is a conceptual diagram illustrating two-pass printing according to the second embodiment. In FIG. 11, the position of the nozzle row NK relative to the sheet PM in the conveying direction is specified for each pass process, as in FIG. 5 described above.

In FIG. 11, the first (j=1) conveying process F1 is the process that conveys the sheet PM to its initial position. The feed amount for the second and subsequent conveying processes Fj (2≤j≤q) is one-half the total nozzle length D. Thus, in the second embodiment, two-pass printing is executed using nozzles over the total nozzle length D for each pass process and equal feed amounts between pass processes.

In FIG. 11, as in FIG. 5, the notation Bj assigned to band areas indicates the region on the sheet PM in which dots can be formed in the jth pass process (i.e., the scanning range for the jth pass process). The upstream (−Y side) section of the band area Bs overlaps the downstream (+Y side) section of the band area Bs+1 (where s is an integer and 1≤s≤q). The overlapping area OAs on the sheet PM is the region in which the band area Bs and band area Bs+1 overlap each other. For example, the overlapping area OA1 is the region in which the upstream section of the band area B1 overlaps the downstream section of the band area B2. Each overlapping area OAs has a length in the sub scanning direction equivalent to one-half the total nozzle length D.

In other words, dots can be formed in the overlapping area OAs through two pass processes including a sth pass process and a (s+1)th pass process. In the sth pass process, dots are formed in the overlapping area OAs using the set of nozzles in the segment of the nozzle row NK positioned on the upstream side (hereinafter called the "upstream segment NPu"). In the (s+1)th pass process, dots are formed in the overlapping area OAs using the set of nozzles in the segment of the nozzle row NK positioned on the downstream side (hereinafter called the "downstream segment NPd").

While not shown in the drawings, the recording rate R for each nozzle in the nozzle row NK is 50% for all nozzles in the pass process. Thus, the sum of the recording rates for the sth pass process and (s+1)th pass process for forming dots in the overlapping area OAs is 100% at all positions in the sub scanning direction of the overlapping area OAs.

Thus, in the second embodiment described above, the entire image in an overlapping area OAs is printed by forming dots in the overlapping area OAs through two pass processes. For example, the images in the overlapping areas OA1, OA2, and OA3 are printed through the first and second pass processes, the second and third pass processes, and the third and fourth pass processes, respectively. In the second embodiment, the initial pass process among the two pass processes for printing an image in an overlapping area OAs will be called the first sub pass process, and the subsequent pass process will be called the second sub pass process. As shown in FIG. 11, dots in the first sub pass process are formed using the set of nozzles in the upstream segment NPu of the nozzle row NK, and dots in the second sub pass process are formed using the set of nozzles in the downstream segment NPd.

In the second embodiment, the area of the dot image corresponding to one of the upstream segment NPu and downstream segment NPd of the nozzle row NK serves as the target area for the forced output process, while the area of the dot image corresponding to the other segment is not subjected to the forced output process when the print data generating process of FIG. 6 is performed.

When printing an overlapping area OAs using two sub pass processes, the method of the second embodiment described above can suppress a decrease in the density of the printed image caused by relative offset among dots formed in the two sub pass processes.

Further, the CPU 110 forms dots in an overlapping area OAs using two sub pass processes in the second embodiment, and the length of each overlapping area in the sub scanning direction is one-half the total nozzle length D of the nozzle row NK. Accordingly, the CPU 110 can print the entire region targeted for printing through two sub pass processes without leaving any gaps, thereby suppressing unevenness in the printed image.

Furthermore, in the second embodiment, the feed amount for each conveying process is longer than that in the first embodiment. More specifically, the feed amount for each conveying process is one-half the total nozzle length D of the nozzle row NK rather than one-third the total nozzle length D. Accordingly, the CPU 110 can print the entire region faster in the second embodiment than in the first embodiment.

C. Third Embodiment

Figure 12:
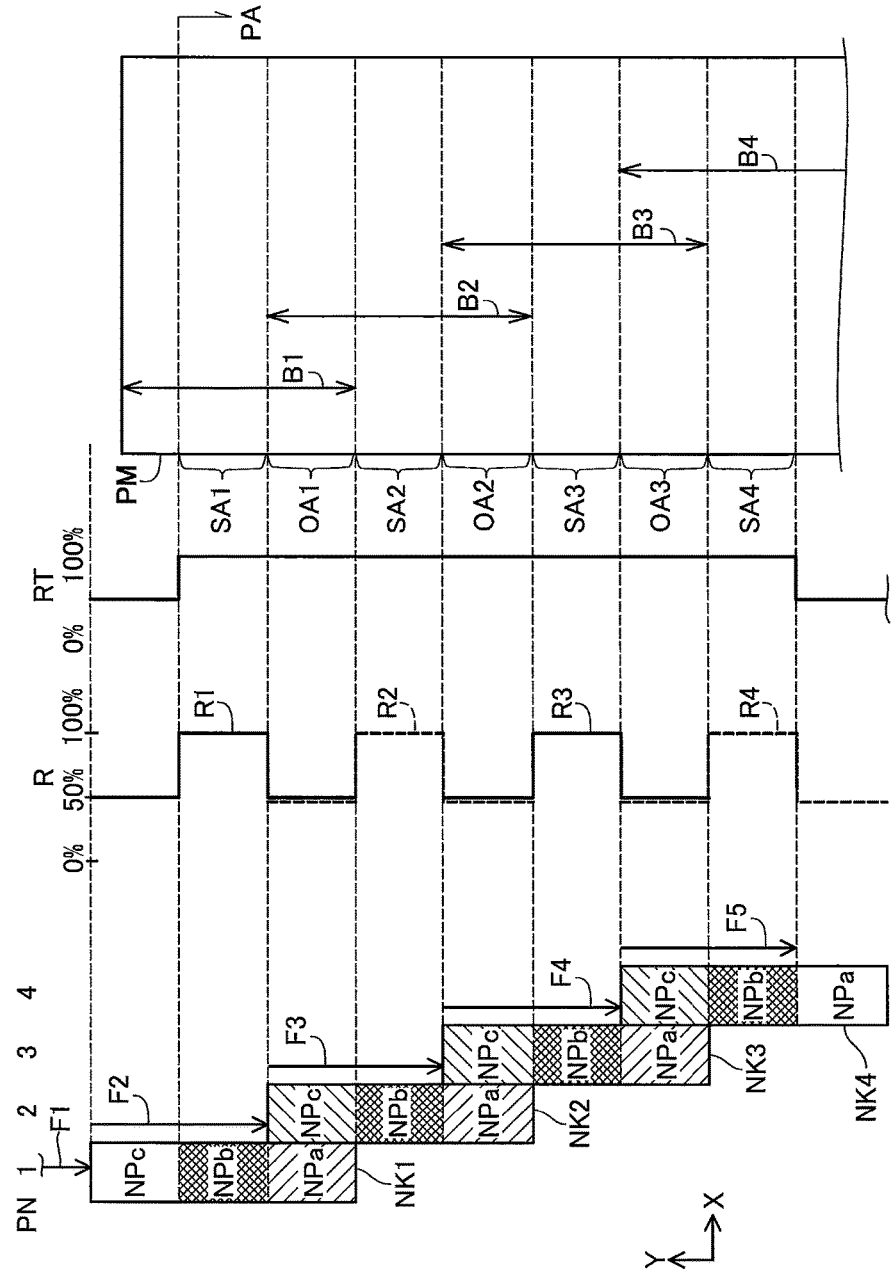
FIG. 12 is a conceptual diagram illustrating a printing process according to a third embodiment.

In the third embodiment, the printing apparatus 600 performs two-pass printing in partial areas of an image-forming region to form dots corresponding to k number of pixels in a single raster line oriented in the main scanning direction by distributing dot formation over two pass processes. The printing apparatus 600 also performs one-pass printing in other partial areas of the image-forming region to form dots corresponding to k number of pixels through a single pass process. FIG. 12 is a conceptual diagram for the printing process according to the third embodiment. In FIG. 12, as in FIG. 5, the position of the nozzle row NK relative to the sheet PM in the conveying direction is specified for each pass process.

The first (j=1) conveying process F1 is the process that conveys the sheet PM to its initial position. The feed amount for the second and subsequent conveying processes Fj (2≤j≤q) is two-thirds of the total nozzle length D. In the present embodiment, printing is executed using nozzles over the total nozzle length D for each pass process and equal feed amounts between pass processes.

As in FIG. 5, the notation Bj assigned to band areas in FIG. 12 indicates the region on the sheet PM in which dots can be formed in the jth pass process (i.e., the scanning range for the jth pass process). The upstream (−Y side) section of a band area Bs overlaps the downstream (+Y side) section of the band area Bs+1 (where s is an integer and 1≤s≤q). An overlapping area OAs on the sheet PM is a region in which a band area Bs and band area Bs+1 overlap each other. A non-overlapping area SAs on the sheet PM is an area that is included entirely in a single band area Bs and that does not overlap another band area. The length of an overlapping area OAs in the sub scanning direction is one-third the total nozzle length D. The length of a non-overlapping area SAs in the sub scanning direction is also one-third the total nozzle length D.

In other words, dots can be formed in an overlapping area OAs through two pass processes including the sth pass process and the (s+1)th pass process. The set of nozzles in the first segment NPa of the nozzle row NK is used to form dots in the overlapping area OAs during the sth pass process, and the set of nozzles in the third segment NPc of the nozzle row NK is used to form dots in the overlapping area OAs during the (s+1)th pass process. Dots can be formed in the non-overlapping area SAs during the sth pass process. The set of nozzles in the second segment NPb of the nozzle row NK is used to form dots in the non-overlapping area SAs during the sth pass process.

FIG. 12 also shows a recording rate Rj for each nozzle in the nozzle row NK during the jth pass process, and a total recording rate RT that represents the sum of recording rates Rj at each position on the sheet PM in the conveying direction. The recording rate Rj of nozzles in the first segment NPa and third segment NPc of the nozzle row NK used in the two-pass printing (i.e., the nozzles used for printing the overlapping area OAs) is 50%. Thus, the total recording rate RT for the sth pass process and (s+1)th pass process that form dots in the overlapping area OAs is 100% at all positions in the overlapping area OAs in the sub scanning direction. The recording rate Rj for the second segment NPb of the nozzle row NK used in the one-pass printing (i.e., the nozzles used for printing the non-overlapping areas SAs) is 100%. Thus, the total recording rate RT is 100% in the entire printing region that includes the overlapping areas OAs and non-overlapping areas SAs.

As described above in the third embodiment, the image in the overlapping area OAs is printed by forming dots in the overlapping area OAs through two pass processes. For example, images in the overlapping areas OA1, OA2, and OA3 are printed in the first and second pass processes, the second and third pass processes, and the third and fourth pass processes, respectively. Of the two pass processes performed to print an image in an overlapping area OAs in the third embodiment, the initial pass process will be called the first sub pass process, and the subsequent pass process will be called the second sub pass process. As shown in FIG. 12, the set of nozzles in the first segment NPa of the nozzle row NK forms dots in the first sub pass process, while the set of nozzles in the third segment NPc forms dots in the second sub pass process.

In the third embodiment, the area of the dot image corresponding to one of the first segment NPa and third segment NPc in the nozzle row NK serves as the target area for the forced output process, and the other area is not subjected to the forced output process when performing the print data generating process of FIG. 6.

When printing an overlapping area OAs using two sub pass processes, the printing apparatus 600 according to the third embodiment described above can suppress a decrease in density of the printed image caused by relative offset among dots formed in the two sub pass processes.

In the third embodiment, the CPU 110 forms dots in an overlapping area OAs using two sub pass processes, but the length of each overlapping area in the sub scanning direction is one-third the total nozzle length D of the nozzle row NK rather than one-half the total nozzle length D. Accordingly, the method of the third embodiment cannot print the entire printing region without gaps, as each of the partial areas of the image (i.e., the non-overlapping areas SA1-SA4) is printed in a single pass process. Consequently, the density of the overlapping areas OAs in which two dots may be formed at a single dot-forming position through forced output may be higher than the density of the non-overlapping areas SAs in which two dots cannot be formed at a single dot-forming position. This may produce more unevenness in the printed image than the methods according to the first and second embodiments.

On the other hand, in the third embodiment, the feed amount for each conveying process is longer than those in the first and second embodiments. Accordingly, the CPU 110 can print the entire region faster in the third embodiment than in the first and second embodiments.

D. Variations of the Embodiments (1) In the printing apparatus 600 according to the first embodiment, the control device 100 forms dots in an overlapping area OAs by controlling the printing mechanism 200 to execute three sub pass processes, and the length of each overlapping area OAs in the sub scanning direction is one-third the total nozzle length D used for printing. In the second embodiment, the control device 100 forms dots in each overlapping area OAs by controlling the printing mechanism 200 to execute two sub pass processes, and the length of each overlapping area OAs in the sub scanning direction is one-half the total nozzle length D used for printing. In more general terms, the control device 100 forms dots in the overlapping area OAs by controlling the printing mechanism 200 to execute N number of sub pass processes (where N is an integer greater than or equal to two), and the length of each overlapping area OAs in the sub scanning direction is preferably 1/N the length of the set of nozzles used for printing from the upstream end to the downstream end in the sub scanning direction. In this way, the printing apparatus 600 can print the entire printing region without gaps in N number of sub pass processes, thereby suppressing unevenness in the printed image.

(2) In the embodiments described above, the printing apparatus 600 prints monochrome images using only the black nozzle row NK. However, the printing apparatus 600 may also print color images using all nozzle rows NC, NM, NY, and NK in the CMYK colors. In this case, the CPU 110 executes a color conversion process in S25 of FIG. 3 on the RGB image data to generate CMYK image data. The CMYK image data represents the color of each pixel in gradation values for the four CMYK color components (hereinafter called CMYK values). In this case, the CPU 110 performs the color conversion process using a lookup table defining correlations between RGB values and CMYK values. CMYK image data may also be thought of as image data including four sets of component image data corresponding to the CMYK colors of ink. The value for each pixel in each set of component image data indicates the density of the corresponding ink for the corresponding pixel. In this case, the CPU 110 executes a halftone process in S30 on each set of component image data to generate dot data for each component. In S35 the CPU 110 executes the print data generating process using the dot data for each component to generate print data for each component. In S40 the CPU 110 controls the printing mechanism 200 to print a single color image using the print data for each color component.

Since dye-based ink tends to permeate paper more readily than pigment-based ink, dots formed with dye-based ink may grow larger in diameter than dots formed in pigment-based ink. Consequently, a decrease in density caused by relative offset among dots described above is less likely to occur when using dye-based ink. Therefore, when printing color images, the CPU 110 may execute the print data generating process of FIG. 6 on first dot data specifying the dot formation states for K ink, which is a pigment-based ink, and may execute a different print data generating process without forced output of dots on second dot data specifying the dot formation states for C, M, and Y ink, which is dye-based ink. The second print data generating process that does not force dot output is equivalent to the print data generating process of FIG. 6 without steps S125, S130, and S135, so that step S140 is performed for all target pixels. In other words, when the values of the first and second pixels in the first dot data corresponding to K ink specify that a dot is to be formed and the first dot data satisfies the specific condition described above, the CPU 110 may form dots in K ink at first positions corresponding to first pixels in the first sub pass process, and may form dots in K ink at both the first positions and the second positions corresponding to second pixels in the second sub pass process. When the values of first and second pixels in second dot data corresponding to a chromatic ink (one of the CMY ink colors) specifies that a dot is to be formed, the CPU 110 may form dots in the chromatic ink at first positions in the first sub pass process and may form dots in the chromatic ink at the second positions and not the first positions in the second sub pass process.

(3) In the print data generating process of FIG. 6, the CPU 110 always executes the process in S135 when determining in S130 that the target block has the specific dot pattern (S130: YES). However, when the target block has the specific dot pattern, the CPU 110 may instead perform the process in S135 at a first probability (50%, for example) and the process in S140 at a second probability (50%, for example). In other words, the CPU 110 need not force output of dots for every target pixel that satisfies the condition for forced output, as in the first embodiment, but instead may force output of dots for some of the target pixels that satisfy this condition.

(4) In the first segment NPa of the nozzle row NK, the recording rate R for dots decreases linearly in the −Y direction in the dot pattern data DPD of FIG. 4. However, the recording rate R in the first segment NPa may instead decrease in steps or along a curved line in the −Y direction. The same description applies to the recording rate R in the third segment NPc.

(5) In the first embodiment described above, the area of the dot image Dom or Doh corresponding to the second segment NPb having a recording rate R of approximately 50% is set as the target area for the forced output process when performing the print data generating process of FIG. 6. However, the target area for the forced output process may instead be set to the areas corresponding to the first segment NPa and third segment NPc having a recording rate R that is not 50% when performing the print data generating process of FIG. 6.

(6) The printing mechanism 200 according to the embodiments can form dots in three sizes, i.e., large, medium, and small sizes. Alternatively, the present invention may employ a printing mechanism 200 capable of forming dots in four sizes including extra large, large, medium, and small sizes. In this case, the CPU 110 may determine in S130 of FIG. 6 that the specific condition has been satisfied for either a first pattern in which the value of one pixel in the block BL specifies formation of an extra large dot while the value of the other pixel specifies formation of a large dot, and a second pattern in which the value of both pixels in the block BL specify formation of an extra large dot.

(7) The printing mechanism 200 may also be configured to form dots in only one size. In this case, the block BL may specify a range corresponding to a prescribed number (five, for example) of pixels aligned continuously in the X-direction, for example. Here, the CPU 110 may determine in S130 of FIG. 6 that the specific condition has been satisfied when the values of a reference number (three, for example) of pixels or greater in the block BL specify that a dot is to be formed.

(8) In each of the embodiments described above, the pass data may be generated without using dot pattern data DPD. For example, in the second embodiment, the CPU 110 may simply form dots in the first sub pass process at positions corresponding to pixels having odd-numbered coordinates in the X-direction and may simply form dots in the second sub pass process at positions corresponding to pixels having even-numbered coordinates in the X-direction.

(9) While the control device 100 in the printing apparatus 600 executes the control process in FIG. 3 according to the embodiments described above, this process may instead be executed by a CPU of a user terminal device, such as a personal computer or a smartphone. In this case, the terminal device may generate print data by executing the process in S10-S35 described above and may control the printing apparatus 600 to execute a print by supplying the print data to the printing apparatus 600. Here, the terminal device is an example of the control device, and the printing apparatus 600 is an example of the printer.

In place of the terminal device, a server connected to the printing apparatus 600 via a network such as the Internet may execute the control process in FIG. 3. In this case, the server executes the control process of FIG. 3 upon receiving a print command from the terminal device or the printing apparatus 600. The server generates print data by executing the process in S10-S35 described above and subsequently controls the printing apparatus 600 to execute a print by supplying the print data to the printing apparatus 600. Note that the server may be a single computer or may be a cloud server that includes a plurality of computers capable of communicating with each other.

(10) In the embodiments described above, part of the configuration implemented in hardware may be replaced with software and, conversely, part of the configuration implemented in software may be replaced with hardware.

When all or some of the functions of the present disclosure are implemented with computer programs, the programs can be stored on a computer-readable storage medium (a non-transitory storage medium, for example). The programs may be used on the same storage medium on which they were supplied or may be transferred to a different storage medium (computer-readable storage medium). The "computer-readable storage medium" may be a portable storage device, such as a memory card or CD-ROM; an internal storage device built into the computer, such as any of various ROM or the like; or an external storage device, such as a hard disk drive, connected to the computer.

While the description has been made in detail with reference to specific embodiments and variations, these embodiments are intended to facilitate understanding of the disclosure and are not intended to limit the disclosure. It would be apparent to those skilled in the art that many modifications and variations may be made thereto without departing from the spirit of the disclosure, the scope of which is defined by the attached claims.

What is claimed is:

1. A control device for controlling a printer, the printer including a print head configured to reciprocally move in a main scanning direction, the print head having a plurality of nozzles arranged in a sub scanning direction perpendicular to the main scanning direction, each of the plurality of nozzles being configured to eject an ink droplet to form a dot on a printing medium, the printer being configured to repeatedly execute a forming process and a conveying process, the forming process forming dots on the printing medium while moving the print head in the main scanning direction, the conveying process intermittently conveying the printing medium in the sub scanning direction with respect to the print head, the control device comprising:

a controller configured to perform:

acquiring target image data representing a target image, the target image including a plurality of pixels, the target image data including a plurality of pixel values for respective ones of the plurality of pixels, each of the plurality of pixel values specifying a dot formation state for a corresponding pixel; and controlling the printer to execute a first forming process and a second forming process, the first forming process forming dots on a first scanning range of the printing medium while moving the print head in the main scanning direction to scan the first scanning range, the second forming process being executed after execution of the first forming process and forming dots on a second scanning range of the printing medium while moving the print head in the main scanning direction to scan the second scanning range, at least part of the first scanning range overlapping at least part of the second scanning range at an overlapping area, wherein the overlapping area includes a first position and a second position, the first position corresponding to a first pixel in the target image, the second position corresponding to a second pixel in the target image, the first pixel having a first pixel value in the target image data, the second pixel having a second pixel value in the target image data, wherein in a case where both the first pixel value and the second pixel value indicate forming a dot and the target image data satisfies a first condition requiring that density in a first region including the first pixel is equal to or more than a first reference, the first forming process forms a dot at the first position and the second forming process forms a dot at both the first position and the second position, and wherein in a case where both the first pixel value and the second pixel value indicate forming a dot and the target image data does not satisfy the first condition, the first forming process forms a dot at the first position and the second forming process does not form a dot at the first position but forms a dot at the second position.

2. The control device according to claim 1, wherein the plurality of nozzles in the print head includes a first set of nozzles and a second set of nozzles, and wherein the first forming process forms dots within the overlapping area while ejecting the ink droplet from the first set of nozzles whereas the second forming process forms dots within the overlapping area while ejecting the ink droplet from the second set of nozzles.

3. The control device according to claim 2, wherein the first set of nozzles is arranged on an upstream side of the second set of nozzles in the sub scanning direction.

4. The control device according to claim 1, wherein the second position includes at least one position at which a dot is not formed in the first forming process but is formed in the second forming process in a case where the target image data satisfies the first condition, and the second pixel includes at least one pixel corresponding to respective one of the at least one position, wherein the overlapping area of the printing medium corresponds to a prescribed area in the target image, the prescribed area encompassing a prescribed number of pixels including the at least one pixel.

5. The control device according to claim 4, wherein a ratio of a number of the at least one pixel to the prescribed number of pixels is 50%.

6. The control device according to claim 1, wherein the first region encompasses a plurality of continuously arranged pixels including the first pixel, the target image data including respective pixel values for the plurality of continuously arranged pixels, and wherein the first condition requires that the first region have a specific dot pattern in which at least two pixel values among the respective pixel values for the plurality of continuously arranged pixels indicate forming a dot.

7. The control device according to claim 6, wherein the printer is configured to form a first type of dot having a first size and a second type of dot having a second size smaller than the first size, wherein the first region encompasses the first pixel and an adjacent pixel adjacent to the first pixel, the adjacent pixel having an adjacent pixel value in the target image data, and wherein in the specific dot pattern, the first pixel value indicates forming the first type of dot and the adjacent pixel value indicates forming the first type of dot.

8. The control device according to claim 1, wherein the controller is configured to further perform:

controlling the printer to execute a third forming process after execution of the first forming process and the second forming process, the third forming process forming dots on a third scanning range of the printing medium while moving the print head in the main scanning direction to scan the third scanning range, at least part of the third scanning range overlapping the at least part of the first scanning range and the at least part of the second scanning range at the overlapping area, wherein the overlapping area further includes a third position corresponding to a third pixel in the target image, the third pixel having a third pixel value in the target image data, wherein in a case where both the second pixel value and the third pixel value indicate forming a dot and the target image data satisfies a second condition requiring that density in a second region is equal to or more than a second reference, the second forming process forms a dot at both the second position and the third position and the third forming process forms a dot at the third position, and wherein in a case where both the second pixel value and the third pixel value indicate forming a dot and the target image data does not satisfy the second condition, the second forming process forms a dot at the second position but does not form at the third position and the third forming process forms a dot at the third position.

9. The control device according to claim 1, wherein the first position includes a plurality of first positions and the second position includes a plurality of second positions, wherein the controller is configured to further perform:

acquiring position information specifying the plurality of first positions and the plurality of second positions in the target image; and selecting a target pixel from the plurality of pixels, the target pixel having a target pixel value in the target image data, a target position corresponding to the target pixel, wherein in a case where the position information specifies that the target pixel is positioned at one of the plurality of first positions and the target pixel value indicates forming a dot, the first forming process forms a dot at the target position, and wherein in a case where the position information specifies that the target pixel is positioned at one of the plurality of second positions and the target pixel value indicates forming a dot, the second forming process forms a dot at the target position.

10. The control device according to claim 1, wherein the first position and the second position are arranged in one line extending in the main scanning direction, the first position and the second position are at same position in the sub scanning direction but different positions in the main scanning direction.

11. The control device according to claim 1, wherein the controller is configured to further perform controlling the printer to execute N number of forming processes including the first forming process and the second forming process to form dots in the overlapping area, where N is an integer greater than two, and wherein the plurality of nozzles has an upstream end and a downstream end in the sub scanning direction, a length from the upstream end to the downstream end in the sub scanning direction is a first length, the overlapping area has a second length in the sub scanning direction, and the second length is 1/N the first length.

12. The control device according to claim 1, wherein the printer is further configured to print the target image on the printing medium with a first type of ink in first color and a second type of ink in second color different from the first color, wherein first dot data specifies dot formation states for each of the plurality of pixels with the first type of ink and second dot data specifies dot formation states for each of the plurality of pixels with the second type of ink, the target image data being the first dot data, wherein in a case where both the first pixel value and the second pixel value in the first dot data indicate forming a dot and the first dot data satisfies the first condition, the first forming process forms a dot at the first position with the first type of ink and the second forming process forms a dot at both the first position and the second position with the first type of ink, and wherein in a case where both the first pixel value and the second pixel value in the second dot data indicate forming a dot, the first forming process forms a dot at the first position with the second type of ink and the second forming process does not form a dot at the first position but forms a dot at the second position with the second type of ink.

13. A non-transitory computer readable storage medium storing a set of program instructions for a control device for controlling a printer, the printer including a print head configured to reciprocally move in a main scanning direction, the print head having a plurality of nozzles arranged in a sub scanning direction perpendicular to the main scanning direction, each of the plurality of nozzles being configured to eject an ink droplet to form a dot on a printing medium, the printer being configured to repeatedly execute a forming process and a conveying process, the forming process forming dots on the printing medium while moving the print head in the main scanning direction, the conveying process intermittently conveying the printing medium in the sub scanning direction with respect to the print head, the control device comprising a controller, the set of program instructions, when executed by the controller, causing the control device to perform:

acquiring target image data representing a target image, the target image including a plurality of pixels, the target image data including a plurality of pixel values for respective ones of the plurality of pixels, each of the plurality of pixel values specifying a dot formation state for a corresponding pixel; and controlling the printer to execute a first forming process and a second forming process, the first forming process forming dots on a first scanning range of the printing medium while moving the print head in the main scanning direction to scan the first scanning range, the second forming process being executed after execution of the first forming process and forming dots on a second scanning range of the printing medium while moving the print head in the main scanning direction to scan the second scanning range, at least part of the first scanning range overlapping at least part of the second scanning range at an overlapping area, wherein the overlapping area includes a first position and a second position, the first position corresponding to a first pixel in the target image, the second position corresponding to a second pixel in the target image, the first pixel having a first pixel value in the target image data, the second pixel having a second pixel value in the target image data, wherein in a case where both the first pixel value and the second pixel value indicate forming a dot and the target image data satisfies a first condition requiring that density in a first region including the first pixel is equal to or more than a first reference, the first forming process forms a dot at the first position and the second forming process forms a dot at both the first position and the second position, and wherein in a case where both the first pixel value and the second pixel value indicate forming a dot and the target image data does not satisfy the first condition, the first forming process forms a dot at the first position and the second forming process does not form a dot at the first position but forms a dot at the second position.

* * * * *